(12) United States Patent  
Iwasaki et al.

(10) Patent No.: US 9,016,156 B2  
(45) Date of Patent: Apr. 28, 2015

(54) DOG CLUTCH CONTROL APPARATUS FOR AUTOMATED TRANSMISSION

(71) Applicant: Aisin Seiki Kabushiki Kaisha, Kariya-shi (JP)

(72) Inventors: Yasuhisa Iwasaki, Ichinomiya (JP); Yusuke Yoshida, Kitanagoya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 14/220,517

(22) Filed: Mar. 20, 2014

(65) Prior Publication Data

US 2014/0291102 A1    Oct. 2, 2014

(30) Foreign Application Priority Data

Mar. 26, 2013   (JP) .................................. 2013-063333

(51) Int. Cl.
| | |
|---|---|
| F16H 61/00 | (2006.01) |
| F16D 11/04 | (2006.01) |
| F16D 11/14 | (2006.01) |
| F16H 61/28 | (2006.01) |
| F16H 61/04 | (2006.01) |

(52) U.S. Cl.
CPC ........ F16D 11/14 (2013.01); *F16H 2061/0474* (2013.01); *F16H 2061/047* (2013.01); F16H 61/0403 (2013.01); F16H 61/2807 (2013.01)

(58) Field of Classification Search
USPC .......... 74/335, 336 R, 339; 192/53.31, 53.32, 192/53.33, 53.34
See application file for complete search history.

(56) References Cited

U.S. PATENT DOCUMENTS

| | | | | |
|---|---|---|---|---|
| 5,022,506 | A | * | 6/1991 | Philippe ...................... 192/53.32 |
| 5,038,884 | A | * | 8/1991 | Hamada et al. ................ 180/233 |
| 6,672,180 | B2 | * | 1/2004 | Forsyth ............................ 74/339 |
| 6,679,133 | B1 | * | 1/2004 | Kayano et al. .................. 74/335 |

(Continued)

FOREIGN PATENT DOCUMENTS

| | | |
|---|---|---|
| DE | 10 2005 054 767 A1 | 5/2007 |
| FR | 2 905 437 A1 | 3/2008 |

(Continued)

OTHER PUBLICATIONS

Extended Search Report issued Jun. 17, 2014 in European Patent Application No. 14160722.6.

(Continued)

*Primary Examiner* — Ha D Ho  
(74) *Attorney, Agent, or Firm* — Oblon, McClelland, Maier & Neustadt, L.L.P.

(57) ABSTRACT

A dog clutch control apparatus for an automated transmission includes a rotary shaft, a dog clutch transmission mechanism including a clutch ring, a clutch hub, a sleeve including a spline, an axial driving device, a dog clutch portion provided at the clutch ring, a rotation speed detection sensor, the spline including high teeth and a low tooth, clutch rear teeth and clutch front teeth formed at the dog clutch portion, and a control unit controlling an operation of the axial driving device based on a deceleration gradient of a rotation speed of either one of the sleeve and the clutch ring detected by the rotation speed detection sensor and controlling the axial driving device so that a decreased thrust load is applied to the clutch rear teeth from the sleeve in a case where the deceleration gradient is smaller than a first predetermined value.

4 Claims, 15 Drawing Sheets

(56) References Cited

U.S. PATENT DOCUMENTS

| | | | |
|---|---|---|---|
| 7,150,698 B2 * | 12/2006 | Sakamoto et al. | 477/5 |
| 7,665,376 B2 * | 2/2010 | Forsyth | 74/330 |

FOREIGN PATENT DOCUMENTS

| | | |
|---|---|---|
| JP | 6-50413 | 2/1994 |
| JP | 3709955 | 10/2005 |
| JP | 2010-96190 | 4/2010 |

OTHER PUBLICATIONS

U.S. Appl. No. 14/219,129, filed Mar. 19, 2014, Yasuhisa Iwasaki, et al.

\* cited by examiner

F I G. 7
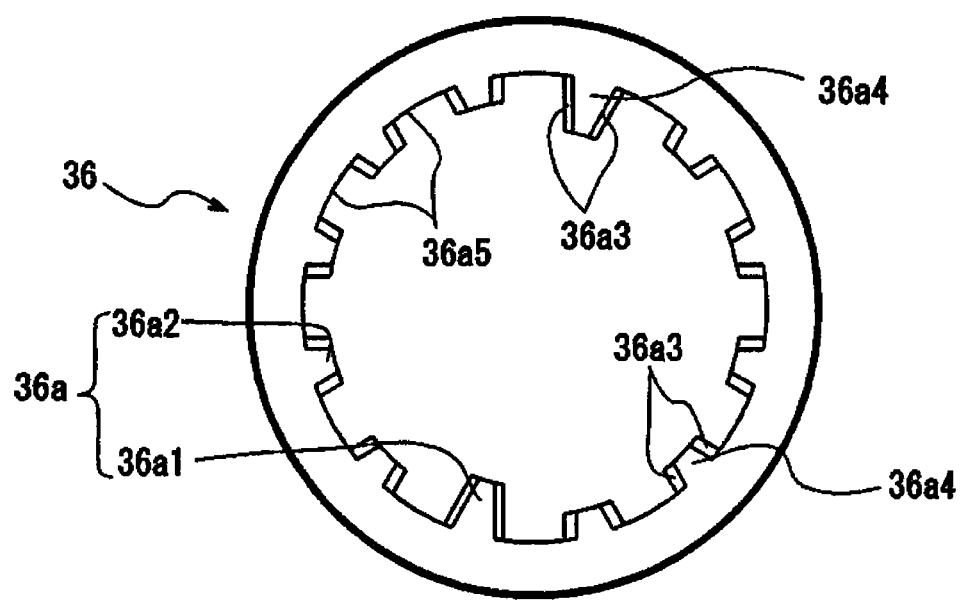

F I G. 20
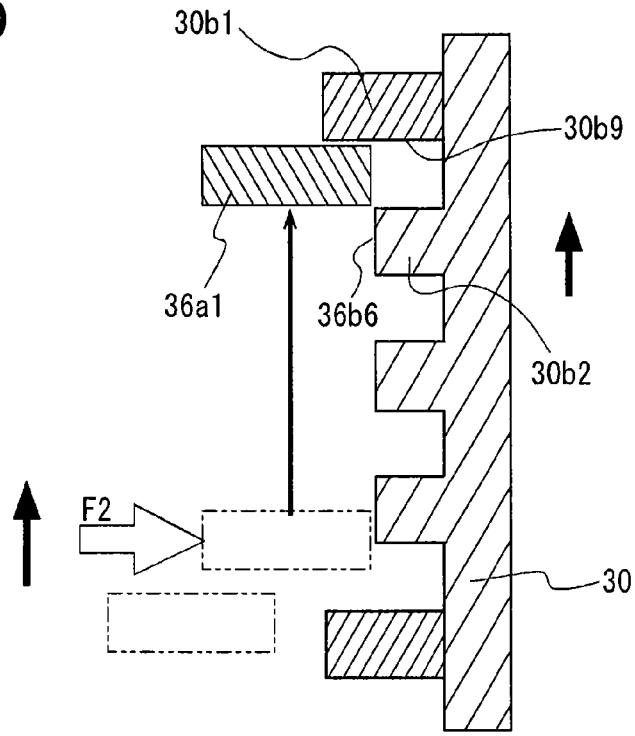
F I G. 21
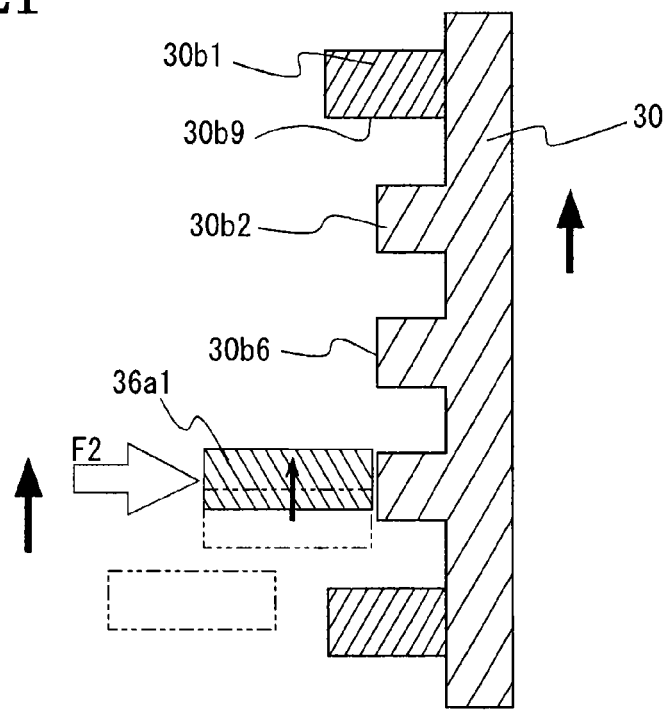

DOG CLUTCH CONTROL APPARATUS FOR AUTOMATED TRANSMISSION

CROSS REFERENCE TO RELATED APPLICATIONS

This application is based on and claims priority under 35 U.S.C. §119 to Japanese Patent Application 2013-063333, filed on Mar. 26, 2013, the entire content of which is incorporated herein by reference.

TECHNICAL FIELD

This disclosure generally relates to a dog clutch control apparatus for an automated transmission.

BACKGROUND DISCUSSION

A powertrain of a vehicle is known to include a transmission which changes torque and/or the number of rotations (i.e., rotation speed) of a driving apparatus including, for example, an engine and/or an electric motor, which is used for driving a driving wheel, so that the torque and/or rotations are transmitted to the driving wheel depending on driving conditions of the vehicle. There are some types of transmissions including, for example, a normally-meshed type transmission. For example, a known normally-meshed type transmission includes plural idler gears, each of which is fitted to or provided at a rotary shaft connected to the driving wheel so that the idler gear is rotatable relative to the rotary shaft and is not movable in a direction of a rotation axis thereof, and plural gears, which are provided around a periphery of a counter shaft arranged to be parallel to the rotary shaft. The idler gears and the gears normally mesh with each other. According to the known normally-engaged type transmission, a sleeve that is spline-fitted to the rotary shaft to be movable in the direction of the rotation axis is arranged side by side with the idler gear. Engaging teeth (spline), which are provided at a joining surface of the sleeve that is joined to the idler gear, are brought to be engaged with engaged teeth (dog clutch teeth) that are provided at a joined surface of the idler gear. Thus, the idler gear engaged with the sleeve and the rotary shaft integrally rotate with each other. The idler gear which rotates integrally with the rotary shaft and the gear of the counter shaft which meshes with the idler gear rotate in association with each other so that torque and/or the number of rotations of the rotary shaft is transmitted to the counter shaft. A shifting operation is performed by selecting, from among the plural idler gears including different numbers of teeth from each other, the idler gear that is to be rotated integrally with the rotary shaft and by bringing the sleeve into engagement with the selected idler gear. Depending on a timing at which the sleeve is pressed against the idler gear, there may be a case where the sleeve and the idler gear fail to engage with each other properly.

In order to bring the sleeve and the idler gear to be engaged with each other in a case where the sleeve is not properly engaged with the idler gear, according to JP3709955B which will be hereinafter referred to as Reference 1, torque with which the sleeve is pushed against the idler gear is once reduced, and thereafter the sleeve is pushed against the idler gear again with a large torque so as to properly engage the sleeve and the idler gear with each other.

According to Reference 1, in a case where the sleeve is not brought into engagement with the idler gear, only an engagement operation is performed again. Therefore, without starting the shifting operation from the beginning, the sleeve and the idler gear are brought into engagement with each other.

According to an electronic shifting apparatus disclosed in JP06-50413A which will be hereinafter referred to as Reference 2, in a case where the shifting to a desired shift position is not obtained, output for shift position change is cut off for a predetermined time period. Thereafter, the output for shift position change is again turned on. Therefore, a sufficient time for switching of a hydraulic switch valve is obtainable. The shifting may be securely performed in a case to be again performed, thereby improving operability of the transmission.

According to a shifting control method disclosed in Reference 1, a timer is used for determining that the sleeve is unable to be brought into engagement with a dog clutch of the idler gear. In a case where the sleeve does not reach a predetermined engagement position after an elapse of a predetermined time period, a reentry control is performed for again bringing the sleeve to engage with the idler gear. Thus, a control end time before the start of the reentry control, which is set by the timer, needs to be set at a value that is equal to or longer than a period of time during which the sleeve moves to the predetermined engagement position properly (that is, the period of time during which the sleeve is brought into engagement with the dog clutch without being bounced back by the dog clutch). Accordingly, at a time point at which it is determined that the sleeve is unable to engage with the dog clutch of the idler gear, the dog clutch is already pushed against the sleeve, and thus a difference in the number of rotations between the sleeve and the idler gear is small. Therefore, it takes time for the sleeve and the idler gear to come to the next position at which the sleeve and the idler gear are engaged with each other. Alternatively, it takes longer time for the sleeve and the idler gear to engage with each other next because the sleeve and the idler gear co-rotate with each other. As a result, a time for the shifting operation may be long.

According to the electronic shifting apparatus disclosed in Reference 2, in a case where the shifting to the desired shift position is not achieved, i.e., engagement is not achieved, a timer is used for cutting or turning off the output for shift position change for a predetermined time period and thereafter again turning on the output for shift position change. The shifting operation is waited until a retry counter by the timer is counted up, for example, which may result in a long period of time for determining that the sleeve is unable to engage with the dog clutch. As a result, a time for the shifting operation may be long.

A need thus exists for a dog clutch control apparatus for an automated transmission which is not susceptible to the drawback mentioned above.

SUMMARY

According to an aspect of this disclosure, a dog clutch control apparatus for an automated transmission includes a rotary shaft rotatably connected to one of an input shaft of an automated transmission and an output shaft of the automated transmission and supported to be rotatable about an axis, and a dog clutch transmission mechanism. The dog clutch transmission mechanism includes a clutch ring rotatably supported at the rotary shaft and rotatably connected to the other of the input shaft and the output shaft, the clutch ring including a mating portion, a clutch hub fixed to the rotary shaft and arranged adjacent to the clutch ring, a sleeve including a spline and fitted to the clutch hub via the spline to be movable in a direction of the axis, an axial driving device for moving the sleeve in the direction of the axis, a dog clutch portion provided at the mating portion of the clutch ring and selectively meshed with the spline of the sleeve in response to an axial movement of the sleeve, the mating portion projecting towards the sleeve, a rotation speed detection sensor for detecting a rotation speed of either one of the sleeve and the clutch ring, the spline including a plurality of high teeth, the rest of the spline corresponding to a low tooth, a tooth depth of each of the high teeth being larger than a tooth depth of the low tooth, clutch front teeth formed at the dog clutch portion to be extended from a front end surface of the dog clutch portion to a rear end position of the dog clutch portion and arranged at positions corresponding to positions of the high teeth, the clutch front teeth of which an outer diameter being larger than an inner diameter of the high teeth and smaller than an inner diameter of the low tooth, and clutch rear teeth formed at the dog clutch portion to be extended from a position which is retracted from the front end surface of the dog clutch portion by a predetermined amount to the rear end position of the dog clutch portion, the clutch rear teeth being configured to be meshed with tooth grooves of the spline. The dog clutch control apparatus also includes a control unit controlling an operation of the axial driving device based on a deceleration gradient of the rotation speed of either one of the sleeve and the clutch ring detected by the rotation speed detection sensor. The control unit controls the axial driving device so that a decreased thrust load is applied to the clutch rear teeth from the sleeve in a case where the deceleration gradient of the rotation speed of either one of the sleeve and the clutch ring detected by the rotation speed detection sensor is smaller than a first predetermined value.

BRIEF DESCRIPTION OF THE DRAWINGS

The foregoing and additional features and characteristics of this disclosure will become more apparent from the following detailed description considered with the reference to the accompanying drawings, wherein:

FIG. 7 is a front view of a sleeve according to the embodiments;

FIG. 20 is a diagram seen from the outer side in the radial direction illustrating the operation of the dog clutch in a state where the high tooth of the sleeve is movable with a large rotational difference between the sleeve and the clutch ring because of a reduction of the thrust load from a first thrust load applied to the high tooth of the sleeve that moves with the small rotational difference between the sleeve and the clutch ring;

FIG. 21 is a diagram seen from the outer side in the radial direction illustrating the operation of the dog clutch in a state where the rotational difference is generated between the sleeve and the clutch ring by the reduction of the thrust load from the first thrust load applied to the high tooth of the sleeve that co-rotates with the clutch ring;

DETAILED DESCRIPTION

Figure 1:
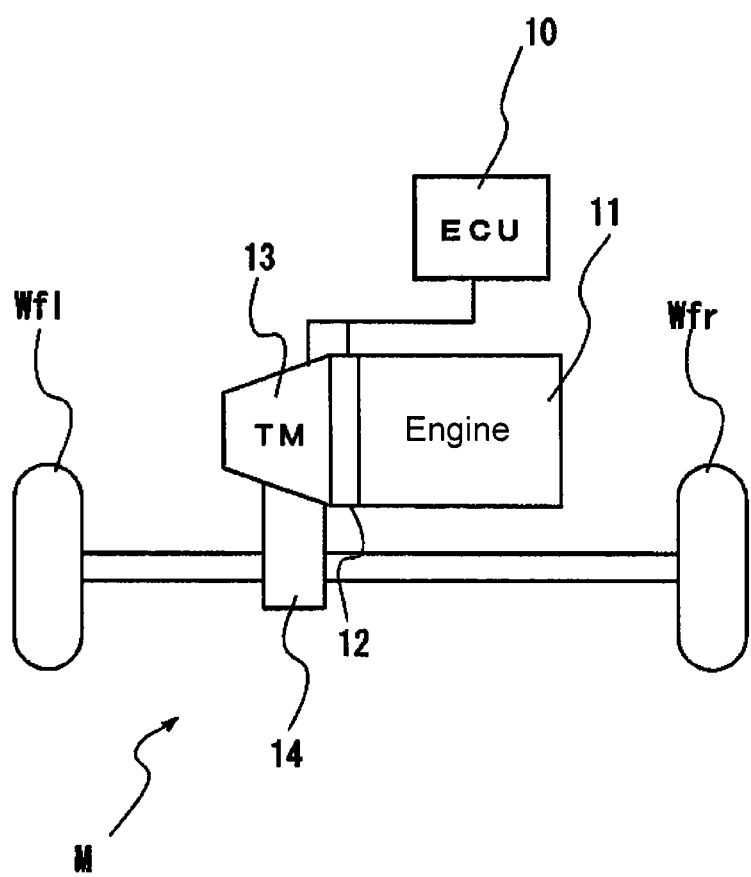
FIG. 1 is a schematic view of a vehicle equipped with an automated transmission including a dog clutch according to embodiments disclosed here.

An automated transmission including a dog clutch control apparatus for an automated transmission according to a first embodiment applied to a vehicle will be explained with reference to the attached drawings. As illustrated in FIG. 1, a vehicle M includes an engine 11, a clutch 12, an automated transmission 13, a differential apparatus 14, and driving wheels, specifically, left and right front wheels Wfl and Wfr. The engine 11 generates a driving force by combustion of fuel. It is configured so that the driving force of the engine 11 is transmitted to the driving wheels Wfl and Wfr via the clutch 12, the automated transmission 13, and the differential apparatus 14. That is, the vehicle M is a so-called front wheel drive vehicle.

The clutch 12 is configured to be automatically connected and disconnected on a basis of a command from a control unit (ECU) 10 serving as the dog clutch control apparatus for the automated transmission of the embodiment. The automated transmission 13 includes therein a dog clutch transmission mechanism, and automatically selects, for example, six forward gears and one backward gear. The differential apparatus 14 includes a final gear and a differential gear, and is formed integrally with the automated transmission 13.

Figure 2:
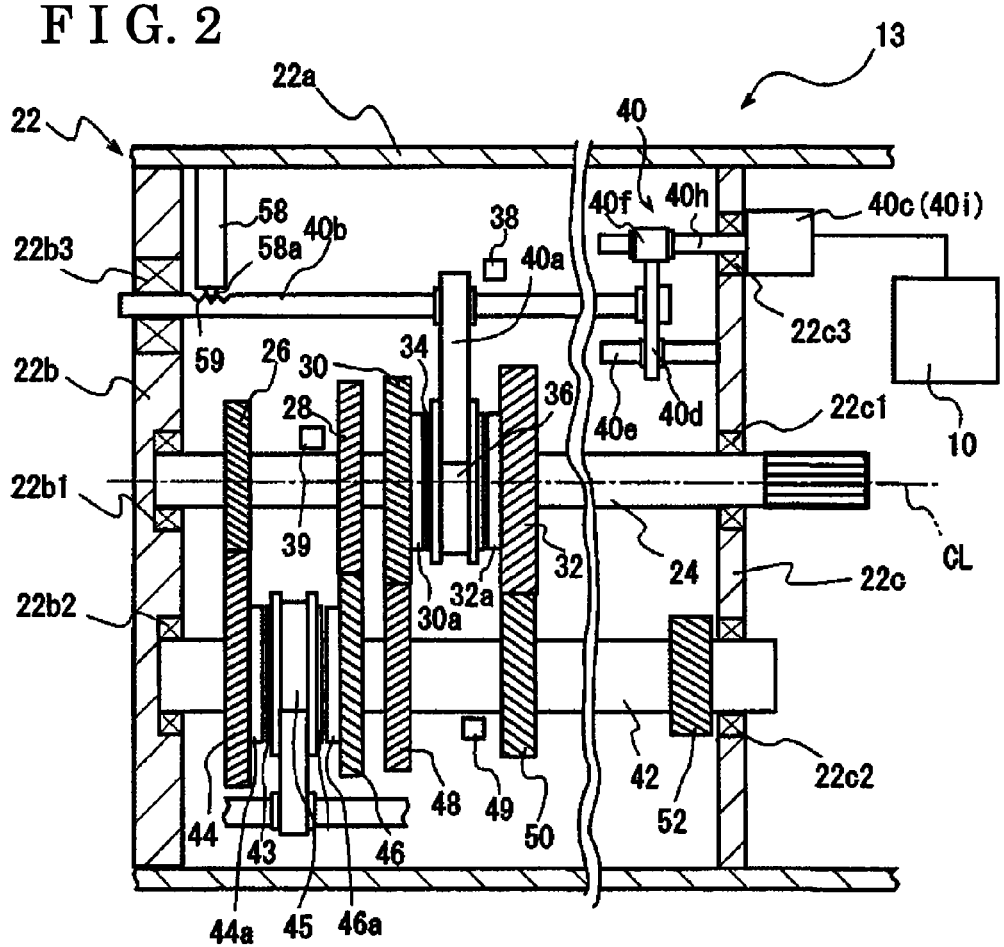
FIG. 2 is a schematic view of the automated transmission including the dog clutch according to the embodiments.

As illustrated in FIG. 2, the automated transmission 13 includes a casing 22, an input shaft 24 serving as a rotary shaft, a first input gear 26, a second input gear 28, a third clutch ring 30 serving as a clutch ring and a third input gear, a fourth clutch ring 32 serving as a fourth input gear and the clutch ring, a clutch hub 34 serving as a hub, a sleeve 36, a stroke position sensor 38, an axial driving device 40, an output shaft 42, a clutch hub 43, a first clutch ring 44 serving as a first output gear and the clutch ring, a sleeve 45, a second clutch ring 46 serving as a second output gear and the clutch ring, a third output gear 48, and a fourth output gear 50. The first clutch ring 44 (the first output gear), the second clutch ring 46 (the second output gear), the clutch hub 43 (the hub), the sleeve 45, and an axial driving device, for example, constitute a first dog clutch transmission mechanism. In addition, the third clutch ring 30 (the third input gear), the fourth clutch ring 32 (the fourth input gear), the clutch hub 34 (the hub), the sleeve 36, the stroke position sensor 38, and the axial driving device 40, for example, constitute a second dog clutch transmission mechanism. The first dog clutch transmission mechanism, the second dog clutch transmission mechanism, and the control unit 10, for example, constitute the dog clutch control apparatus for the automated transmission.

The casing 22 includes a body 22a formed in a substantially cylinder configuration with a bottom, a first wall 22b serving as the bottom (bottom wall) of the body 22a, and a second wall 22c dividing the inside of the body 22a in right and left directions in FIG. 2.

The input shaft 24 is rotatably supported at the casing 22. Specifically, a first end (i.e., a left end in FIG. 2) of the input shaft 24 is supported at the first wall 22b via a bearing 22b1. A second end (i.e., a right end in FIG. 2) of the input shaft 24 is supported at the second wall 22c via a bearing 22c1. The second end of the input shaft 24 is rotatably connected to an output shaft of the engine 11 via the clutch 12. Thus, output of the engine 11 is input to the input shaft 24 in a state where the clutch 12 is in a connected state. The input shaft 24 serves as the rotary shaft of the disclosure. The input shaft (the rotary shaft) 24 is directly and rotatably connected to an input shaft of the automated transmission 13. The input shaft 24 is supported to be rotatable around a rotation axis CL serving as an axis (axis line).

The first input gear 26, the second input gear 28, the third clutch ring 30 (the third input gear), and the fourth clutch ring 32 (the fourth input gear) are provided at the input shaft 24. The first and second input gears 26 and 28 are fixed to the input shaft 24 by, for example, spline-fitting, so as not to be rotatable relative to the input shaft 24. The third input gear is formed at an outer periphery of the third clutch ring 30 that is supported at the input shaft 24 to be rotatable relative to the input shaft 24. The fourth input gear is formed at an outer periphery of the fourth clutch ring 32 that is supported at the input shaft 24 to be rotatable relative to the input shaft 24. The clutch hub 34 is fixed to the input shaft 24 by, for example, spline fitting so that the clutch hub 34 is inhibited from rotating relative to the input shaft 24. The clutch hub 34 is positioned between the third clutch ring 30 and the fourth clutch ring 32 to be adjacent or next thereto. The third clutch ring 30 (third input gear) is meshed with a third output gear while the fourth clutch ring 32 (fourth input gear) is meshed with a fourth output gear.

The output shaft 42 is provided at the casing 22 to be arranged parallel to the input shaft 24. The output shaft 42 is rotatably supported at the casing 22. Specifically, a first end (a left end in FIG. 2) of the output shaft 42 is supported at the first wall 22b via a bearing 22b2 and a second end (a right end in FIG. 2) of the output shaft 42 is supported at the second wall 22c via a bearing 22c2.

The first clutch ring 44 (the first output gear), the second clutch ring 46 (the second output gear), the third output gear 48, the fourth output gear 50, and a fifth output gear 52 are provided at the output shaft 42. The first clutch ring 44 is meshed with the first input gear 26 via a helical gear formed at an outer peripheral surface of the first clutch ring 44. The second clutch ring 46 is meshed with the second input gear 28 via a helical gear formed at an outer peripheral surface of the second clutch ring 46. The third output gear 48 is meshed with the third clutch ring 30 via a helical gear formed at an outer peripheral surface of the third output gear 48. The fourth output gear 50 is meshed with the fourth clutch ring 32 via a helical gear formed at an outer peripheral surface of the fourth output gear 50. The fifth output gear 52 is meshed with an input gear of the differential apparatus 14 via a helical gear formed at an outer peripheral surface of the fifth output gear 52. A first dog clutch portion 44a (i.e., a dog clutch portion) in a ring form is formed at a surface (i.e., a mating portion) of the first clutch ring 44 facing the clutch hub 43. A second dog clutch portion 46a (i.e., the dog clutch portion) in a ring form is formed at a surface (i.e., a mating portion) of the second clutch ring 46 facing the clutch hub 43.

A rotation speed detection sensor 49 formed by a rotary encoder, for example, is provided in the vicinity of the output shaft 42. The number of rotations of the output shaft 42, i.e., rotation speed of the output shaft 42, is detected so as to detect the number of rotations (rotation speed) of the third clutch ring 30 provided at the input shaft 24, for example.

The clutch hub 43 (the hub) is fixed to the output shaft 42 by, for example, spline-fitting and positioned between the first clutch ring 44 and the second clutch ring 46 to be adjacent or next thereto. The configurations of the first clutch ring 44, the second clutch ring 46 and the clutch hub 43, for example, are substantially the same as those of the third clutch ring 30, the fourth clutch ring 32, and the clutch hub 34 provided at the input shaft 24 and thus explanations of the first clutch ring 44, the second clutch ring 46 and the clutch hub 43 are omitted. The third output gear 48, the fourth output gear 50, and the fifth output gear 52 are fixed to the output shaft 42 by, for example, spline-fitting. The driving force of the engine 11 is input from the input shaft 24 to be transmitted to the output shaft 42 and is finally output to the differential apparatus 14.

The second dog clutch transmission mechanism provided at the input shaft 24, and the first dog clutch transmission mechanism provided at the output shaft 42 include substantially the same configurations. Thus, the configuration of the second dog clutch transmission mechanism provided at the input shaft 24 is explained below.

Figure 4:
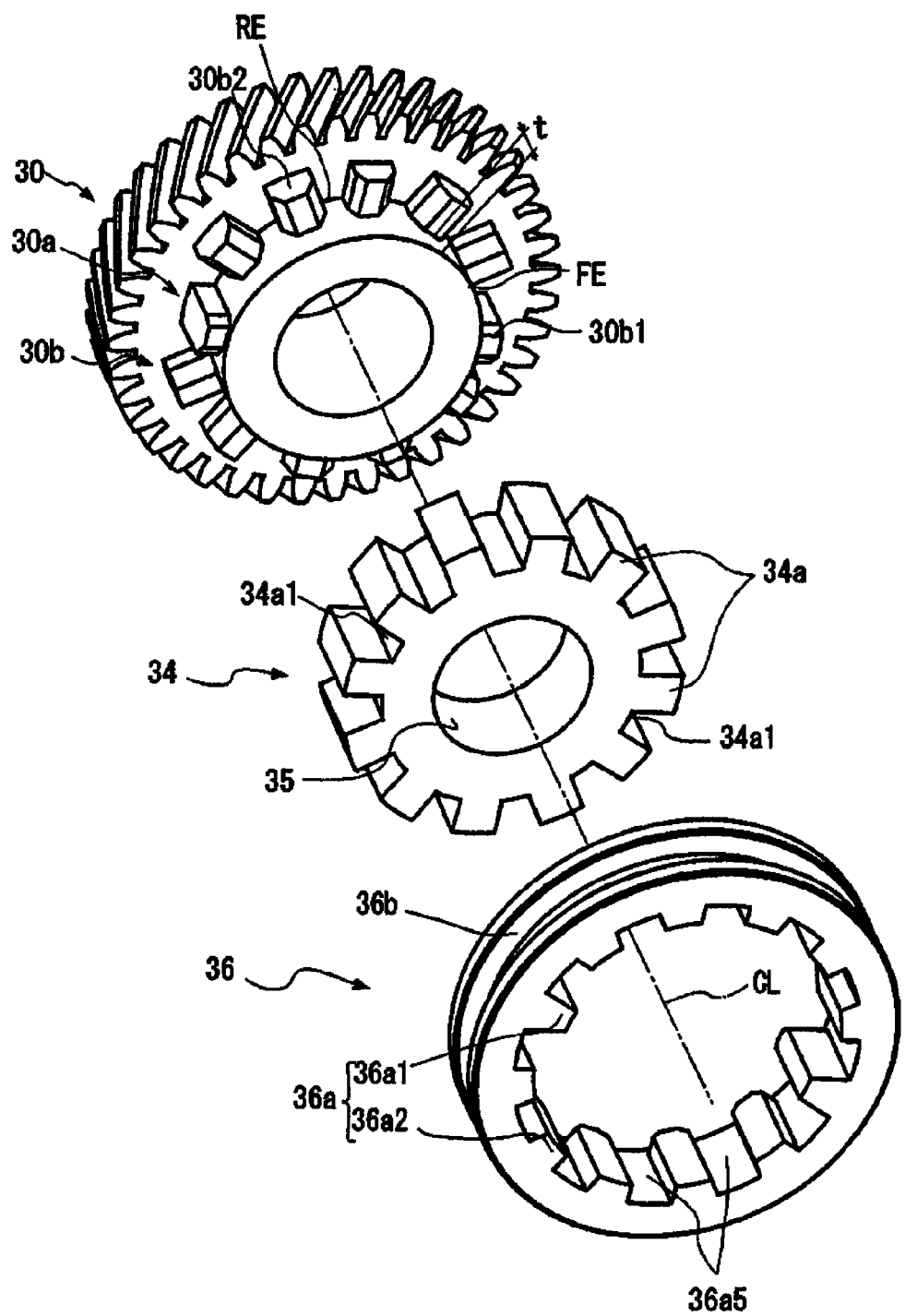
FIG. 4 is a perspective view of a dog clutch transmission mechanism according to the embodiments.
Figure 6:
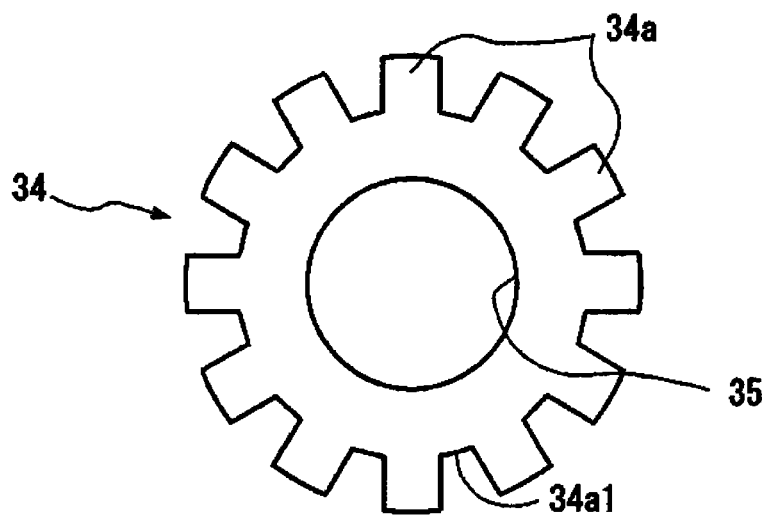
FIG. 6 is a front view of a clutch hub according to the embodiments.

The clutch hub 34 is supported at the input shaft 24 by spline-fitting so that the clutch hub 34 is integrally rotatable with the input shaft 24. As illustrated in FIGS. 4 and 6, the clutch hub 34 includes an engagement hole 35 (of which a spline configuration is omitted in FIGS. 4 and 6) to which the input shaft 24 is spline-fitted, and includes a flat cylindrical form. The clutch hub 34 also includes spline teeth 34a at an outer peripheral surface. For example, twelve of the spline teeth 34a are formed at even intervals in a circumferential direction. Each of the spline teeth 34a is formed to include the same diameter of an addendum circle (a tooth tip circle). In addition, each of the spline teeth 34a is formed to include the same diameter of a dedendum circle (a tooth root circle) to thereby form meshing grooves 34a1 each of which includes a depth so that high teeth 36a1 and low teeth 36a2 of the sleeve 36 are configured to be meshed with the meshing grooves 34a1. Inner teeth (i.e., a spline) 36a of the sleeve 36 are slidably engageable with the respective spline teeth 34a of the clutch hub 34.

The sleeve 36 is formed in a substantially annular form. An outer peripheral groove 36b is formed at an outer periphery of the sleeve 36 in a circumferential direction thereof. A fork 40a (see FIG. 2) of the axial driving device 40 is slidably engageable with the outer peripheral groove 36b. As illustrated in FIGS. 4 and 7, twelve of the inner teeth 36a formed at an inner periphery of the sleeve 36 are arranged at even intervals in a circumferential direction. Each of the inner teeth 36a is formed to include the same diameter of a dedendum circle. The inner teeth 36a include the high teeth 36a1 and the low teeth 36a2. A tooth depth, i.e., a tooth height corresponding to a length in a radial direction, of each of the high teeth 36a1 differs from a tooth depth of each of the low teeth 36a2. The high teeth 36a1, each of which includes a large tooth depth, i.e., a high tooth height, are formed as a pair on the circumference so as to face each other at a 180 degree interval therebetween. The other inner teeth 36a, i.e., the ten low teeth 36a2, are formed to include the same tooth depth smaller than the tooth depth of the high teeth 36a1. The sleeve 36 includes end surfaces (front end surfaces 36a4) which face the third and fourth clutch rings 30 and 32, respectively, and which correspond to surfaces of the high teeth 36a1 and the low teeth 36a2 at a right angle relative to the rotation axis CL. Each of the aforementioned surfaces of the high teeth 36a1 and the low teeth 36a2 includes corners located at a front end and a rear end in a rotation direction of the sleeve 36. The corners include chamfered surfaces 36a3 formed at substantially 45 degrees angle relative to the rotation direction (see FIG. 7). Accordingly, the corners of each of the high teeth 36a1 and the low teeth 36a2 are inhibited from being damaged or chipped off by an impact with dog clutch teeth which will be explained later, of the third and fourth clutch rings 30 and 32. A tooth groove 36a5 is formed between each of the high teeth 36a1 and the low tooth 36a2 adjacent to the high tooth 36a1, and between the low teeth 36a2 adjacent to each other. Clutch front teeth 30b1 and clutch rear teeth 30b2, which will be described below, of the third clutch ring 30 are fitted to the tooth grooves 36a5 respectively. The high teeth 36a1 and the low teeth 36a2 of the sleeve 36 engage with the meshing grooves 34a1 of the clutch hub 34.

A rotation speed detection sensor 39 formed by a rotary encoder, for example, is provided in the vicinity of the input shaft 24. The number of rotations of the input shaft 24 (i.e., rotation speed of the input shaft 24) is detected so as to detect the number of sleeve rotations (rotation speed) of the sleeve 36.

The third clutch ring 30 including a third dog clutch portion 30a (i.e., the dog clutch portion) and the fourth clutch ring 32 including a fourth dog clutch portion 32a (i.e., the dog clutch portion) are provided at the input shaft 24 to be adjacent to the clutch hub 34, i.e., positioned at opposed sides of the clutch hub 34 in the direction of the rotation axis CL. Here, the third clutch ring 30 and the fourth clutch ring 32 include substantially symmetrical configurations relative to the clutch hub 34. Thus, the configuration of the third clutch ring 30 is explained below.

Figure 5:
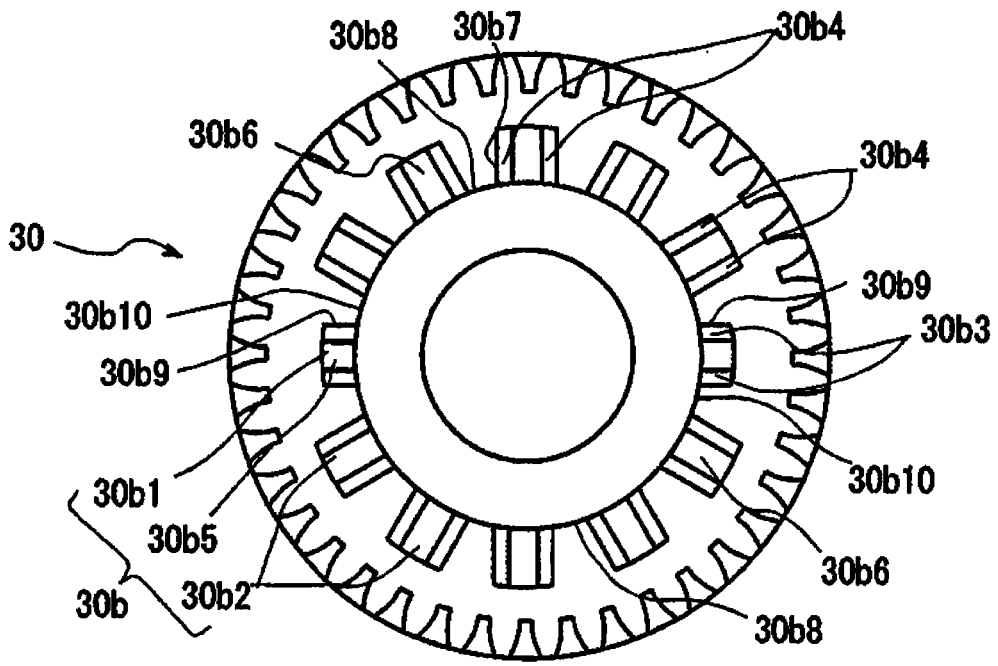
FIG. 5 is a front view of a clutch ring according to the embodiments.

As illustrated in FIGS. 4 and 5, the third clutch ring 30 is provided at the input shaft 24 via a bearing to be rotatable relative to the input shaft 24 and unmovable relative to the input shaft 24 in the direction of the rotation axis (axis line) CL. The third input gear formed at the outer peripheral surface of the third clutch ring 30 constitutes an idler gear rotatable relative to the input shaft 24. The third dog clutch portion 30a in a ring form is formed at a surface (i.e., a mating portion) of the third clutch ring 30 facing the clutch hub 34. Plural dog clutch teeth 30b configured to be meshed with the inner teeth 36a of the sleeve 36 are formed at an outer periphery of the third dog clutch portion 30a. The dog clutch teeth 30b include two kinds of teeth including different tooth depths from each other, i.e., the clutch front teeth 30b1 and the clutch rear teeth 30b2. The dog clutch teeth 30b are formed at even intervals in a circumferential direction of the third clutch ring 30. Each of the dog clutch teeth 30b is formed to include the same diameter of a dedendum circle. The clutch front teeth 30b1 are formed as a pair on the circumference so as to face each other at a 180 degree interval therebetween. The clutch front teeth 30b1 are formed in such a manner that an outer diameter of an addendum circle of the clutch front teeth 30b1 is larger than an inner diameter of an addendum circle of the high teeth 36a1 of the sleeve 36 and is smaller than an inner diameter of an addendum circle of the low teeth 36a2 of the sleeve 36. The clutch front teeth 30b1 are formed to extend from a front end surface FE of the third dog clutch portion 30a constituting the mating portion to a rear end position RE of the third dog clutch portion 30a in the direction of the rotation axis CL. Each of the clutch front teeth 30b1 includes lateral surfaces 30b9 (i.e., front tooth lateral surfaces) that extend towards the sleeve 36. A chamfered portion 30b3 (i.e., a front chamfered portion) inclined at substantially 45 degrees angle relative to the rotation direction of the third clutch ring 30 is formed at each of the lateral surfaces 30b9. The clutch front teeth 30b1 of the third clutch ring 30 are configured to engage with the high teeth 36a1 of the sleeve 36 and not to engage with the low teeth 36a2 in a case where the sleeve 36 comes closer to the third clutch ring 30 while rotating relative to the third clutch ring 30. A front end portion of each of the clutch front teeth 30b1 is formed by a front end surface 30b5 facing the sleeve 36 and the chamfered portions 30b3.

As illustrated in FIGS. 4 and 5, five of the clutch rear teeth 30b2 are arranged at a phase position between the two clutch front teeth 30b1 and another five of the clutch rear teeth 30b2 are arranged at another phase position between the two clutch front teeth 30b1. That is, ten of the clutch rear teeth 30b2 are provided in total. The clutch rear teeth 30b2 are formed in such a manner that an outer diameter of an addendum circle of the clutch rear teeth 30b2 is larger than the inner diameter of the addendum circle of the low teeth 36a2 of the sleeve 36. The clutch rear teeth 30b2 are formed to extend from a position retracted in the direction of the rotation axis CL by a predetermined amount t from the front end surface FE of the third dog clutch portion 30a to the rear end position RE of the third dog clutch portion 303 that constitutes the mating portion. Each of the clutch rear teeth 30b2 includes lateral surfaces 30b7 (i.e., rear tooth lateral surfaces) that extend towards the sleeve 36. A chamfered portion 30b4 (i.e., a rear chamfered portion) inclined at substantially 45 degrees angle relative to the rotation direction of the third clutch ring 30 is formed at each of the lateral surfaces 30b7. A tooth groove 30b8 is formed between the clutch rear teeth 30b2 adjacent to each other while a tooth groove 30b10 is formed between each of the clutch front teeth 30b1 and the clutch rear tooth 30b2 adjacent to the clutch front tooth 30b1. In a case where the sleeve 36 comes closer to the third clutch ring 30 while rotating relative to the third clutch ring 30, as the high teeth 36a1 and the low teeth 36a2 move into or enter the position at the third clutch ring 30, the position which is retracted by the predetermined amount t, the clutch rear teeth 30b2 engage with the high teeth 36a1 and the low teeth 36a2 of the sleeve 36. As the clutch rear teeth 30b2 engage with the high teeth 36a1 and the low teeth 36a2 of the sleeve 36, a large rotational torque is transmitted safely and reliably. A front end portion of each of the clutch rear teeth 30b2 is formed by a front end surface 30b6 facing the sleeve 36 and the chamfered portions 30b4.

As the stroke position sensor 38, a position sensor from among a variety of sensor types, including, but not limited to, a position sensitive detector or a linear encoder, may be used.

Figure 3:
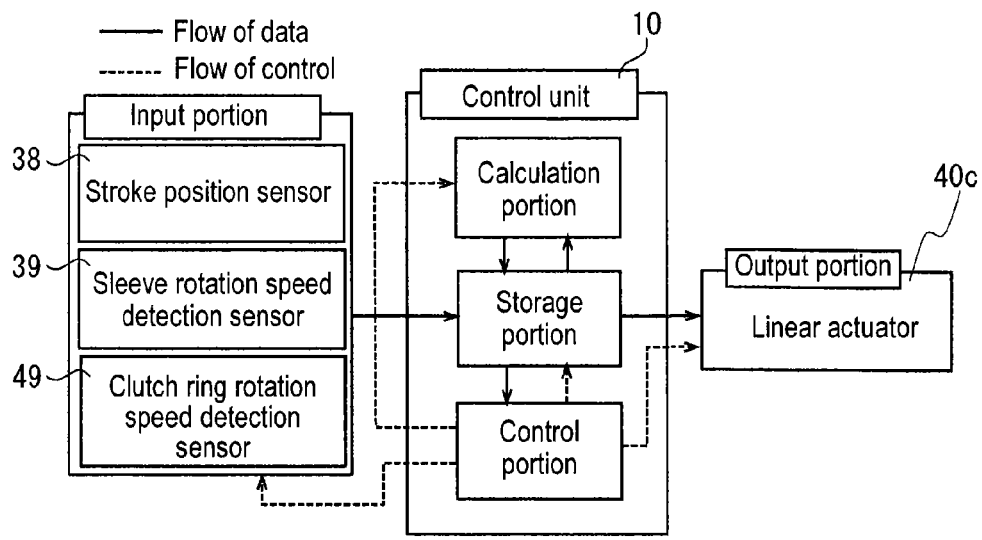
FIG. 3 is a block diagram of a control unit according to the embodiments.

As illustrated in FIG. 3, the control unit 10 includes a storage portion, a calculation portion and a control portion. The control unit 10 calculates a deceleration gradient at the calculation portion based on the number of rotations detected by the rotation speed detection sensor 39, i.e., the number of rotations (rotation speed) of the sleeve 36, and the number of rotations detected by the rotation speed detection sensor 49, i.e., the number of rotations (rotation speed) of the third clutch ring 30. The control unit 10 then compares the calculated deceleration gradient with a first predetermined deceleration gradient value (a first predetermined value) or a second predetermined deceleration gradient value (a second predetermined value) stored at the storage portion beforehand. As a result, the control unit 10 controls a linear actuator 40i serving as a drive source of the axial driving device 40 to generate a first thrust load F1 (an increased thrust load) or a second thrust load F2 (a decreased thrust load) at the sleeve 36. The control unit 10 controls a thrust load value of the linear actuator 40i serving as the drive source of the axial driving device 40 and a moving position of the front end surfaces 36a4 of the high teeth 36a1 based on relative position signals. The relative position signals indicate a relative position of a distal and (the front end surfaces 36a4 of the high teeth 36a1) of the sleeve 36 which is detected by the stroke position sensor 38 relative to the front end surface FE of the third dog clutch portion 30a, a relative position of the distal end of the sleeve 36 which is detected by the stroke position sensor 38 relative to the front end portions of the clutch rear teeth 30b2 and a relative position of the distal end of the sleeve 36 which is detected by the stroke position sensor 38 relative to the rear end position RE of the third dog clutch portion 30a, respectively.

The axial driving device 40 reciprocates the sleeve 36 along the axial direction, that is, the sleeve 36 performs the axial movement. In a case where a reaction force is applied from the third clutch ring 30 or the fourth clutch ring 32 to the sleeve 36 in a state where the sleeve 36 is pressed or pushed against the third clutch ring 30 or the fourth clutch ring 32, the axial driving device 40 allows the sleeve 36 to move by the reaction force.

The axial driving device 40 includes the fork 40a, a fork shaft 40b and a drive device 40c. A distal end portion of the fork 40a is formed to match an outer peripheral configuration of the outer peripheral groove 36b of the sleeve 36. A base end portion of the fork 40a is fixed to the fork shaft 40b. The fork shaft 40b is supported at the casing 22 to be slidable along the axial direction. That is, a first end (i.e., a left end in FIG. 2) of the fork shaft 40b is supported at the first wall 22b via a bearing 22b3 and a second end (i.e., a right end in FIG. 2) of the fork shaft 40b is fixed at a bracket 40d. The bracket 40d is slidably supported by a guide member (a rotation lock) 40e which protrudes in the axial direction from the second wall 22c. The bracket 40d is fixed to a nut member 40f so as not to be rotatable relative thereto. The nut member 40f is meshed with, i.e., threadedly engaged with, a driving shaft 40h including the drive device 40c in a manner that the nut member 40f may advance or retreat, that is, the nut member 40f may reciprocate in the axial direction. The driving shaft 40h is supported at the second wall 22c via a bearing 22c3.

The drive device 40c is a linear drive apparatus of which drive source is the linear actuator 40i. The linear actuator 40i includes a linear actuator of a ball screw type, for example. The ball screw type linear actuator includes, for example, a casing, a rotor, the driving shaft 40h (a ball screw shaft), and the nut member 40f. The casing in a cylindrical form includes a stator that is formed by plural coils arranged in an inner circumferential direction. The rotor which is provided to be rotatable relative to the stator includes plural north pole magnets and south pole magnets alternately arranged at an outer circumference. The north pole magnets and the south pole magnets face the stator while having a magnetic gap relative to the stator. The driving shaft 40h integrally rotates with the rotor about an axis of the stator. The nut member 40f formed by a ball nut is meshed with the driving shaft 40h. The driving shaft 40h is screwed into the nut member 40f to be rotatable relative to the nut member 40f via plural balls. An electric power supply to each of the coils of the stator is controlled to arbitrarily and selectively rotate the driving shaft 40h in forward and rearward directions. As a result, the nut member 40f and the fork shaft 40b are driven to reciprocate and are positioned and retained at an arbitrary position. In addition, because of an elongated lead of the ball screw shaft, the drive device 40c allows the sleeve 36 to move by a reaction force that may be applied to the sleeve 36 from the third clutch ring 30 or the fourth clutch ring 32.

A detent mechanism 58 is provided at the fork shaft 40b to be positioned in the vicinity of the first wall 22b. The detent mechanism 58 includes a stopper 58a that is biased by a spring in a direction orthogonal to an axis of the fork shaft 40b. The stopper 58a is fitted and inserted to each of plural triangular grooves 59 formed at the fork shaft 40b along the axis thereof so that the sliding movement of the fork shaft 40b in the axial direction thereof may be retained at an arbitrary position.

In the embodiment, the linear actuator of ball screw type is used as the drive device. Alternatively, other drive device, for example, a solenoid drive device or a hydraulic drive device may be used as long as the drive device allows the sleeve 36 to move by the reaction force that may be applied to the sleeve 36 from the third clutch ring 30 or the fourth clutch ring 32 in a state where the sleeve 36 is pressed or pushed against the third clutch ring 30 or the fourth clutch ring 32.

Figure 8:
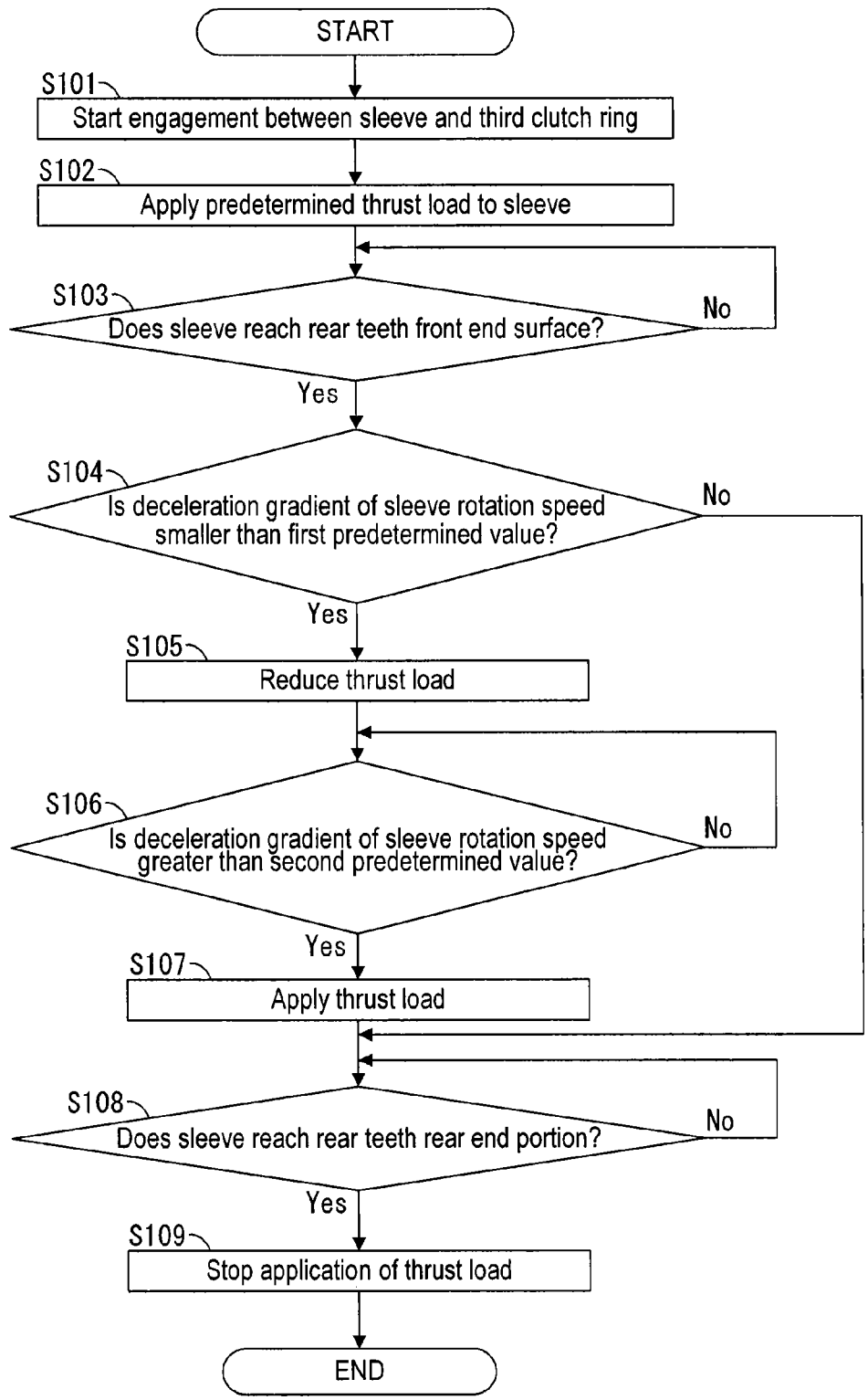
FIG. 8 is a flowchart of a thrust load control of an axial driving device according to the embodiments.

Next, an operation of the above-described dog clutch apparatus for the automated transmission will be explained with reference to a flowchart in FIG. 8. For example, at an up-shift operation in a case where the sleeve 36 rotates at a high speed and with a small moment of inertia while the third clutch ring 30 (the third input gear) rotates at a low speed and with a large moment of inertia, the rotation speed of the sleeve 36 decreases. On the other hand, at a down-shift operation, in a case where the sleeve 36 rotates at a low speed and with a small moment of inertia while the third clutch ring 30 rotates at a high speed and with a large moment of inertia, the rotation speed of the sleeve 36 increases. In the following, an operation for reducing the speed of the sleeve 36 at the up-shift operation is explained.

The sleeve 36 is arranged between the third clutch ring 30 and the fourth clutch ring 32 in a state to be arranged at a neutral position at which the inner teeth (spline) 36a of the sleeve 36 are inhibited from engaging with the dog clutch teeth 30b and the like of the third clutch ring 30 and the fourth clutch ring 32.

A boundary position between each of the chamfered portions 30b4 of each of the clutch rear teeth 30b2 of the third clutch ring 30 and each of the lateral surfaces 30b7 of each of the clutch rear teeth 30b2 serves as a first stroke position S1. The position of a rear end surface of each of the clutch rear teeth 30b2 (the rear end position RE of the third dog clutch portion 30a) serves as a second stroke position S2.

Figure 12:
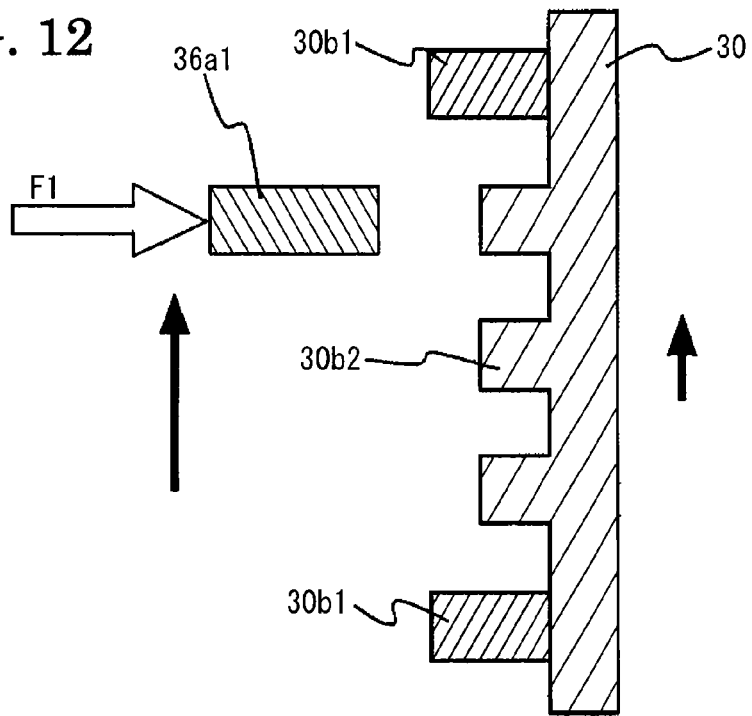
FIG. 12 is a diagram seen from an outer side in a radial direction illustrating an operation of the dog clutch in a state where the sleeve is in a neutral position.

Upon receiving a signal of shift start, the control unit 10 applies a control current to the linear actuator 40i of the axial driving device 40 so that a thrust force necessary for moving the sleeve 36 is generated or applied. As a result, the engagement (engagement operation) between the sleeve 36 and the third clutch ring 30 is started as illustrated in FIG. 12 (step 101, which will be hereinafter referred to as S101). The driving shaft 40h is elongated by the linear actuator 40i to move the fork shaft 40b. The fork 40a then causes the sleeve 36 to slide towards the third clutch ring 30. The sleeve 36 comes closer to the third clutch ring 30 while rotating relative to the third clutch ring 30 by an amount corresponding to a rotational difference between the sleeve 36 and the third clutch ring 30. At this time, the control unit 10 controls the linear actuator 40i so that the first thrust load F1 (i.e., a predetermined thrust load) is applied to the sleeve 36 (S102).

Then, the high teeth 36a1 of the sleeve 36 are brought in contact with the front end surfaces 30b5 or the chamfered portions 30b3 of the clutch front teeth 30b1 of the third clutch ring 30. Because of the aforementioned contact, the rotational difference between the sleeve 36 and the third clutch ring 30 is slightly reduced. At this time, the low teeth 36a2 of the sleeve 36 are inhibited from making contact with any portion or member.

In a case where the front end surface 36a4 of each of the high teeth 36a1 is brought in contact with the front end surface 30b5 of each of the clutch front teeth 30b1 but is bounced back so that each of the high teeth 36a1 is inhibited from entering further from the front end surface 30b5, the sleeve 36 is again brought to come closer to the third clutch ring 30 by the first thrust load F1 applied to the sleeve 36.

Further, it is determined, by the stroke position sensor 38, whether or not each of the high teeth 36a1 of the sleeve 36 reaches the position of the front end surface 30b6 of each of the clutch rear teeth 30b2 after the front end surface 36a4 of each of the high teeth 36a1 enters further from, i.e., enters deeply relative to, the front end surface 30b5 of each of the clutch front teeth 30b1 (i.e., rear teeth front end surface) in a state where the sleeve 36 is further brought to come closer to the third clutch ring 30 (S103). In a case where it is determined that each of the high teeth 36a1 does not reach the front end surface 30b6 of each of the clutch rear teeth 30b2, the determination is repeated until each of the high teeth 36a1 reaches the front end surface 30b6 of each of the clutch rear teeth 30b2.

The process for determining, by the stroke position sensor 38, whether or not each of the high teeth 36a1 of the sleeve 36 reaches the front end surface 30b6 of each of the clutch rear teeth 30b2 is not necessary and may be omitted. At this time, because of the aforementioned process, however, the position of each of the high teeth 36a1 is confirmed to determine whether each of the high teeth 36a1 of the sleeve 36 is in contact with the lateral surface 30b9 of each of the clutch front teeth 30b1, the rotational difference between the sleeve 36 and the third clutch ring 30 is reduced while each of the high teeth 36a1 of the sleeve 36 is in contact with the front end surface 30b6 of each of the clutch rear teeth 30b2 without being in contact with the lateral surface 30b9 of each of the clutch front teeth 30b1, or the third clutch ring 30 and the sleeve 36 rotate substantially together (i.e., co-rotate with each other). As a result, a further accurate engagement control may be obtained.

Figure 9:
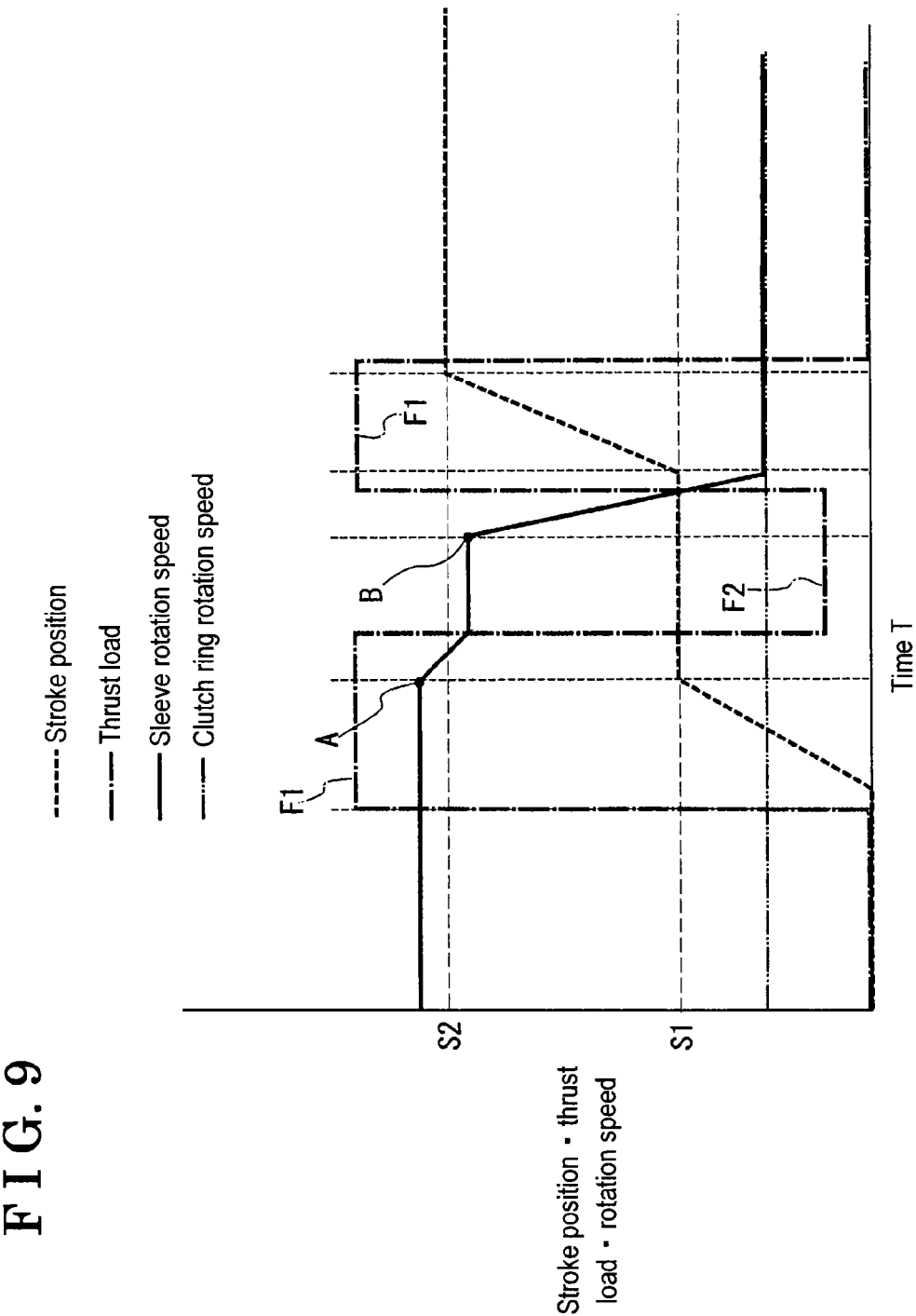
FIG. 9 is a time chart illustrating a relationship among a stroke position and a rotation speed of the sleeve, a rotation speed of the clutch ring, and a thrust load with time for a shifting operation according to the embodiments.
Figure 10:
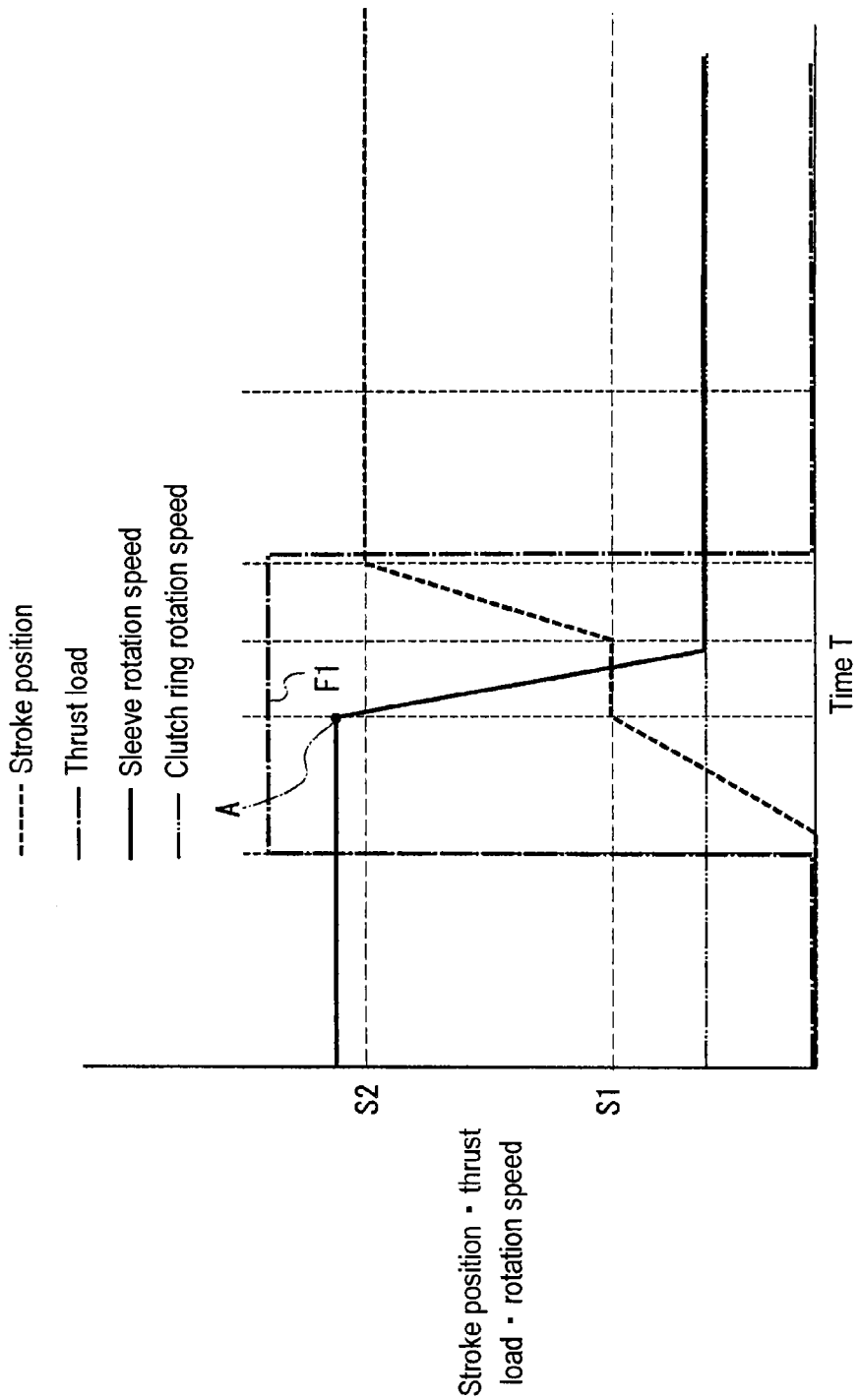
FIG. 10 is a time chart illustrating a relationship among the stroke position and the rotation speed of the sleeve, the rotation speed of the clutch ring, and the thrust load in a case where the sleeve is brought into engagement with the clutch ring for a minimum period of time.

In a case where the control unit 10 determines that the high teeth 36a1 of the sleeve 36 come at or reach the position of the clutch rear teeth 30b2 as indicated by S1 in FIG. 9, it is determined, by the rotation speed detection sensor 39, whether the deceleration gradient of the rotation speed of the sleeve 36 is smaller than the first predetermined deceleration gradient value (S104 and a point A in FIG. 9). The first predetermined deceleration gradient value (the first predetermined value) is specified beforehand by confirming a situation in which the high teeth 36a1 of the sleeve 36 make contact with the clutch rear teeth 30b2 and thus the rotation speed of the sleeve 36 gradually decreases, the situation including the co-rotation of the sleeve 36 and the third clutch ring 30. It is determined whether or not the deceleration gradient of the rotation speed of the sleeve 36 is smaller than the first value in S104.

Figure 15:
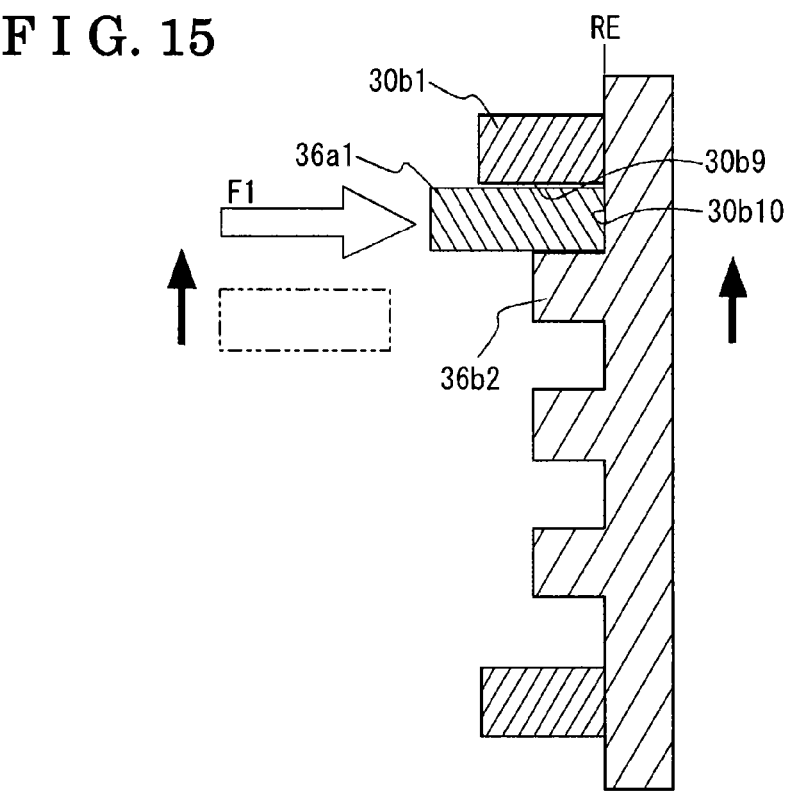
FIG. 15 is a diagram seen from the outer side in the radial direction illustrating the operation of the dog clutch in a state where the high tooth of the sleeve enters deeply relative to the clutch ring while being guided by the lateral surface of the clutch front tooth.

In a case where it is determined that the deceleration gradient of the rotation speed of the sleeve 36 is sufficiently greater than the first predetermined value, for example, greater than the second predetermined deceleration gradient value (the second predetermined value) in S104, it is regarded that the high teeth 36a1 of the sleeve 36 directly make contact with the lateral surfaces 30b9 of the clutch front teeth 30b1 without contacting with the front end surfaces 30b6 of the clutch rear teeth 30b2 and thus the rotation speed of the sleeve 36 is greatly reduced. Therefore, the application of the first thrust load F1 is continued to cause the high teeth 36a1 to enter the tooth grooves 30b10. Next, in S108, it is determined whether or not the sleeve 36 reaches the rear end position RE of the third dog clutch portion 30a as illustrated in FIG. 15.

In a case where it is determined that the deceleration gradient of the rotation speed of the sleeve 36 is slightly greater than the first predetermined value, for example, smaller than the second predetermined value in S104, it is regarded that the high teeth 36a1 of the sleeve 36 make contact with the front end surfaces 30b6 of the clutch rear teeth 30b2 and thus the rotation speed of the sleeve 36 is slightly reduced, and thereafter the high teeth 36a1 of the sleeve 36 make contact with the lateral surfaces 30b9 of the clutch front teeth 30b1. In the aforementioned case, the application of the first thrust load F1 is also continued to cause the high teeth 36a1 to enter the tooth grooves 30b10. Next, in S108, it is determined whether or not the sleeve 36 reaches the rear end position RE of the third dog clutch portion 30a as illustrated in FIG. 15.

Figure 11:
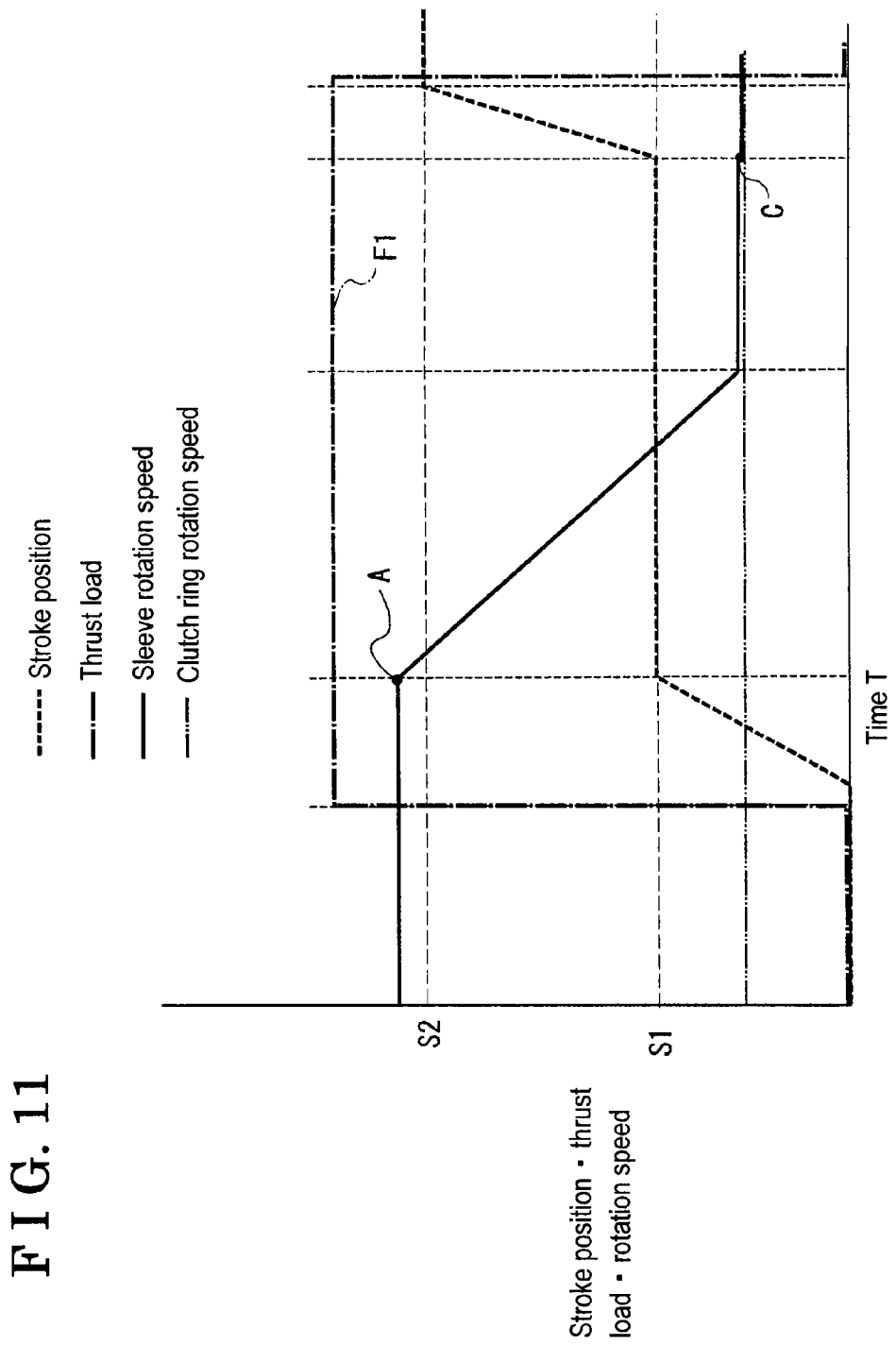
FIG. 11 is a time chart illustrating a relationship among the stroke position and the rotation speed of the sleeve, the rotation speed of the clutch ring, and the thrust load in a case where the sleeve is brought into engagement with the clutch ring for a long period of time.
Figure 16:
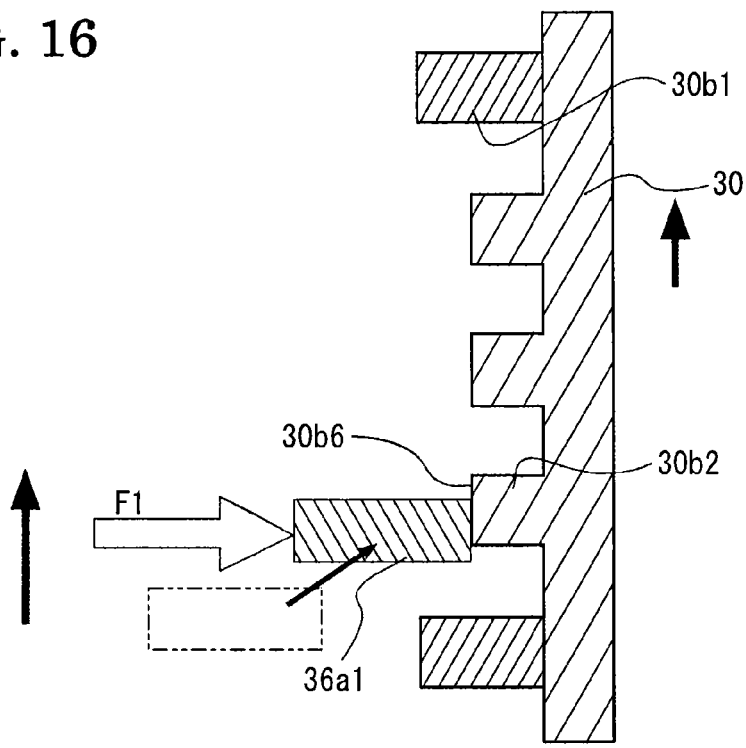
FIG. 16 is a diagram seen from the outer side in the radial direction illustrating the operation of the dog clutch in a state where the sleeve makes contact with the clutch rear tooth.
Figure 17:
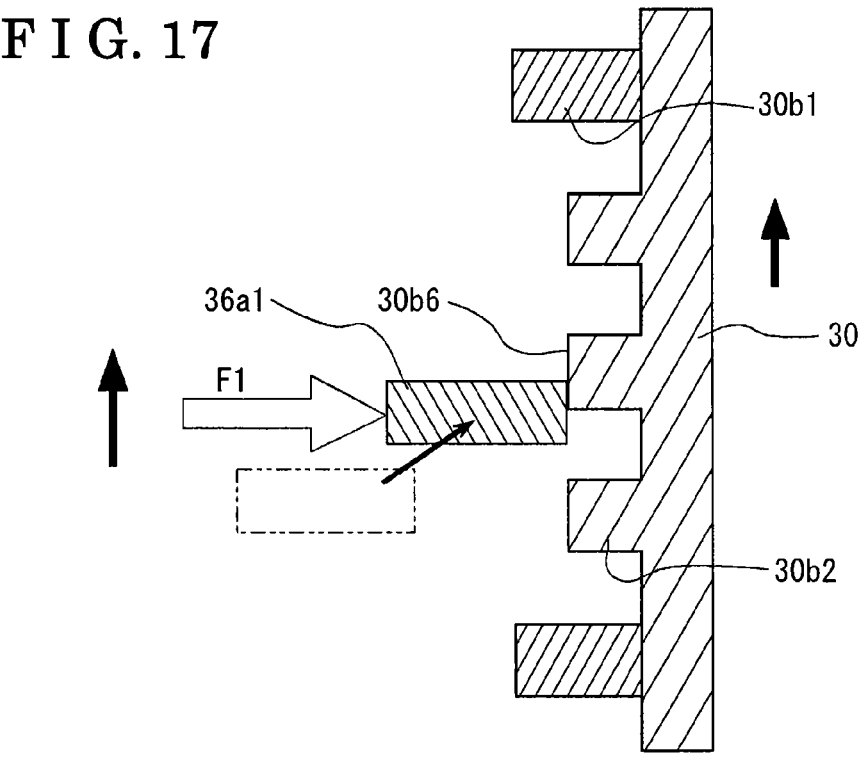
FIG. 17 is a diagram seen from the outer side in the radial direction illustrating the operation of the dog clutch in a state where the sleeve makes contact with the clutch rear tooth that is not adjacent to the clutch front tooth.
Figure 18:
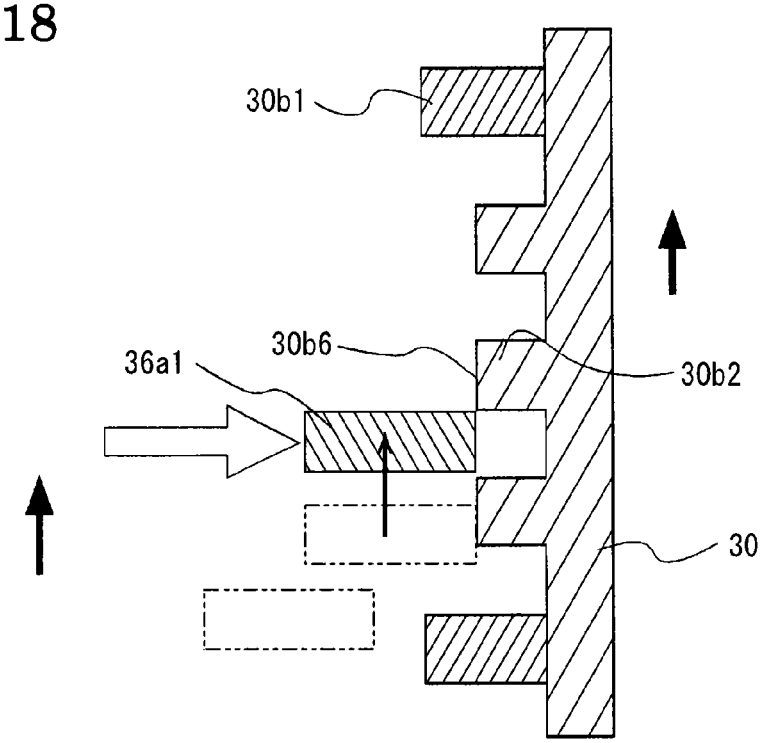
FIG. 18 is a diagram seen from the outer side in the radial direction illustrating the operation of the dog clutch in a state where the high tooth of the sleeve moves with a small rotational difference between the sleeve and the clutch ring.
Figure 19:
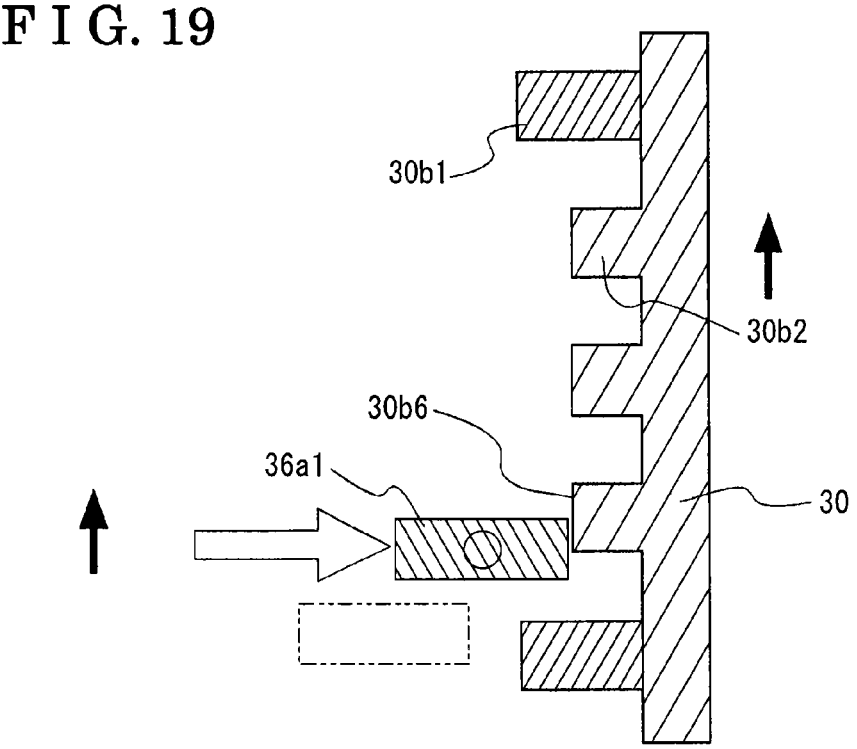
FIG. 19 is a diagram seen from the outer side in the radial direction illustrating the operation of the dog clutch in a state where the sleeve and the clutch ring co-rotate with each other.
Figure 22:
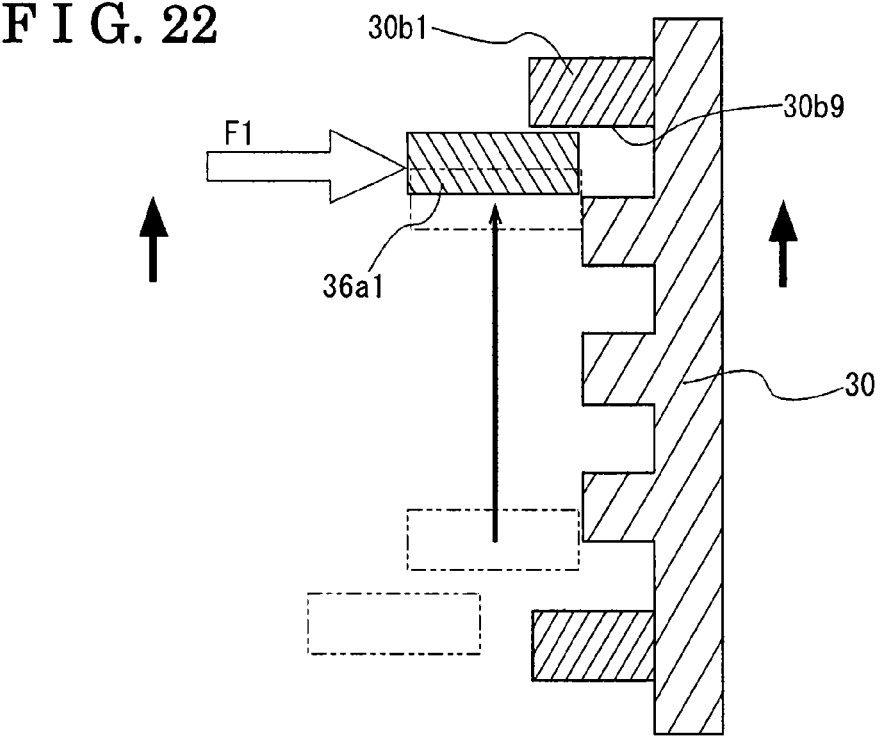
FIG. 22 is a diagram seen from the outer side in the radial direction illustrating the operation of the dog clutch in a state where the first thrust load is applied to the sleeve that reaches the position of the lateral surface of the clutch front tooth because of the reduction of the thrust load.

In a case where it is determined that the deceleration gradient of the rotation speed of the sleeve 36 is smaller than the first predetermined value in S104, the application of the thrust load is reduced to the second thrust load F2 from the first thrust load F1 in S105. The smaller deceleration gradient of the rotation speed of the sleeve 36 than the first predetermined value indicates that the high teeth 36a1 of the sleeve 36 make contact with the front end surfaces 30b6 of the clutch rear teeth 30b2 that are not adjacent to the high teeth 36a1 as illustrated in FIGS. 16 and 17 and thus the rotation speed of the sleeve 36 is gently reduced. Therefore, when the first thrust load F1 is continuously applied to the sleeve 36, the high teeth 36a1 of the sleeve 36 move to the clutch front teeth 30b1 with a small rotational difference between the sleeve 36 and the third clutch ring 30 as illustrated in FIG. 18 or the sleeve 36 and the third clutch ring 30 rotate at the same number of rotations (i.e., at the same speed), i.e., rotate together (co-rotate) as illustrated in FIG. 19. In such case, the continuous application of the first thrust load F1 may lead to an increased time period for the high teeth 36a1 of the sleeve 36 to reach the position of the lateral surfaces 30b9 of the clutch front teeth 30b1 (i.e., a point C in FIG. 11) after the high teeth 36a1 make contact with the clutch rear teeth 30b2 (i.e., the point A and the first stroke position S1 in FIG. 11). As a result, a time period for shifting operation may be elongated.

In the present embodiment, as illustrated in FIG. 9, the thrust load is reduced from the first thrust load F1 in a case where the deceleration gradient of the rotation speed of the sleeve 36 is smaller than the first predetermined value after the point A. Thus, a state where the high teeth 36a1 of the sleeve 36 are in contact with the clutch rear teeth 30b2 so that the sleeve 36 and the third clutch ring 30 rotate with a small rotational difference therebetween is released. The rotational difference between the sleeve 36 and the third clutch ring 30 may be easily secured so that a time period for the sleeve 36 to contact with the lateral surfaces 30b9 of the clutch front teeth 30b1 of the third clutch ring 30 is reduced. For example, a friction force between the high teeth 36a1 and the clutch rear teeth 30b2 is reduced so as to further decrease the deceleration gradient of the rotation speed of the sleeve 36 by the decrease of the thrust load to the second thrust load F2 from the first thrust load F1 as illustrated in FIG. 20. Accordingly, the high teeth 30a1 promptly move to the lateral surfaces 30b9 of the clutch front teeth 30b1.

In a case where the sleeve 36 and the third clutch ring 30 co-rotate with each other as illustrated in FIG. 21, the reduction of the thrust load from the first thrust load F1 to the second thrust load F2 causes the rotational difference between the sleeve 36 and the third clutch ring 30 based on difference in rotational inertia or difference in rotational sliding resistance, for example, between the sleeve 36 and the third clutch ring 30.

Figure 13:
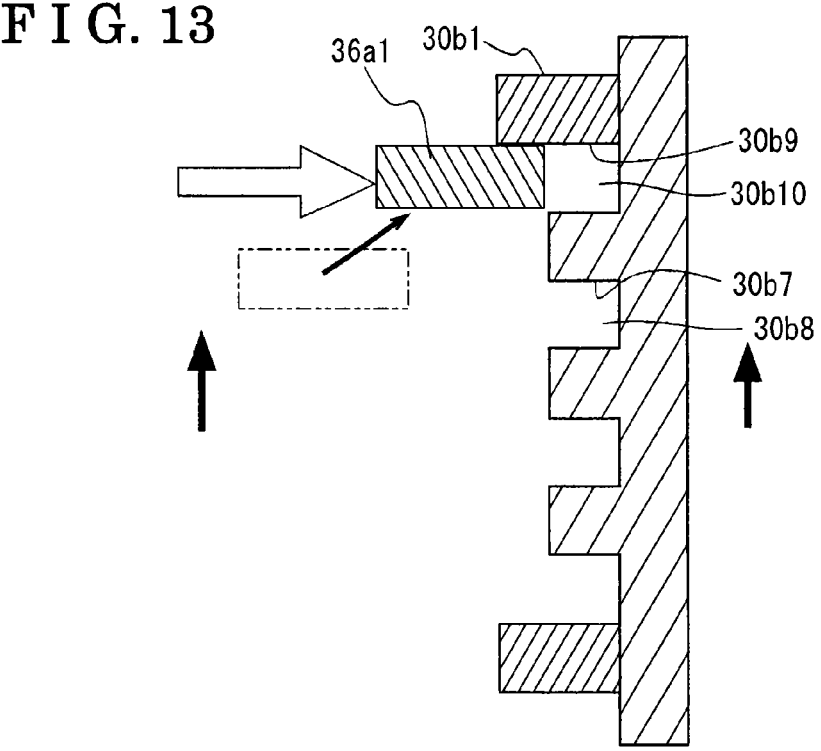
FIG. 13 is a diagram seen from the outer side in the radial direction illustrating an operation of the dog clutch in a state where a high tooth of the sleeve makes direct contact with a lateral surface of a clutch front tooth of the clutch ring.
Figure 14:
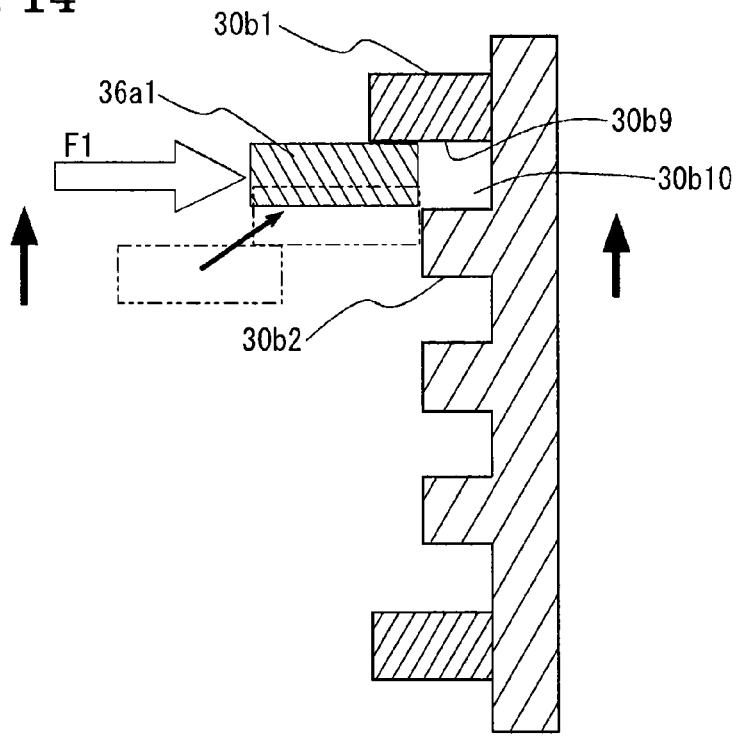
FIG. 14 is a diagram seen from the outer side in the radial direction illustrating the operation of the dog clutch in a state where the high tooth of the sleeve makes contact with the lateral surface of the clutch front tooth after contacting with a front end surface of a clutch rear tooth.

In a case where the thrust load is reduced to the second thrust load F2 from the first thrust load F1, the control unit 10 determines whether or not the deceleration gradient of the rotation speed of the sleeve 36 is greater than the second predetermined value by the rotation speed detection sensor 39 in S106. The deceleration gradient of the rotation speed of the sleeve 36 becomes greater than the second predetermined value in a case where the high teeth 36a1 of the sleeve 36 make contact with the lateral surfaces 30b9 of the clutch front teeth 30b1 as illustrated in FIG. 20 so that the rotation speed of the sleeve 36 rapidly changes, i.e., the high rotation speed of the sleeve 36 rapidly changes to conform to the low speed rotation of the third clutch ring 30. The aforementioned state is substantially similar to the state illustrated in FIG. 13 or 14 in which the deceleration gradient of the rotation speed of the sleeve 36 is greater than the first predetermined value.

In a case where it is determined that the deceleration gradient of the rotation speed of the sleeve 36 is smaller than the second predetermined value, the determination is repeated until the value of the deceleration gradient greater than the second predetermined value is detected.

In a case where it is determined that the deceleration gradient of the rotation speed of the sleeve 36 is greater than the second predetermined value (i.e., a point B in FIG. 9), the first thrust load F1 is applied for causing the sleeve 36 to be meshed with the third clutch ring 30 in S107. Because of the first thrust load F1 applied to the sleeve 36, the high teeth 36a1 of the sleeve 36 enter the tooth grooves 30b10 between the clutch front teeth 30b1 and the clutch rear teeth 30b2 while being guided by the lateral surfaces 30b9 of the clutch front teeth 30b1.

Figure 23:
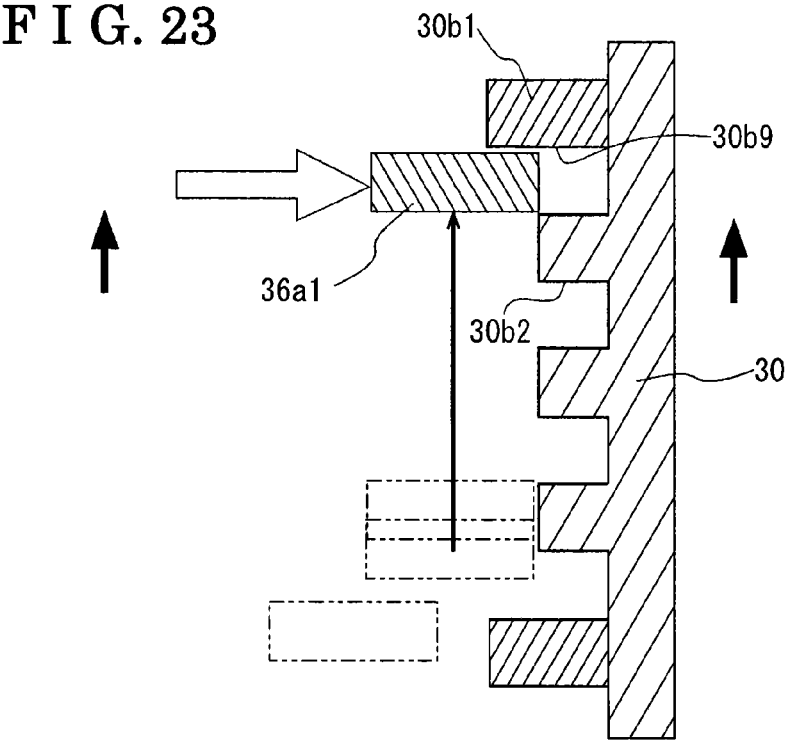
FIG. 23 is a diagram seen from the outer side in the radial direction illustrating the operation of the dog clutch in a state where the first thrust load is applied to the sleeve that reaches the position of the lateral surface of the clutch front tooth from a state where the sleeve co-rotates with the clutch ring.

In a case where the sleeve 36 and the third clutch ring 30 co-rotate with each other, the rotational difference between the sleeve 36 and the third clutch ring 30 increases because of the application of the first thrust load F1 to the sleeve 36 and thus the high teeth 36a1 of the sleeve 36 make contact with the lateral surfaces 30b9 of the clutch front teeth 30b1 as illustrated in FIG. 23, which leads to the rapid decrease of the rotation speed of the sleeve 36. Then, because of the first thrust load F1 applied to the sleeve 36, the high teeth 36a1 of the sleeve 36 enter the tooth grooves 30b10 between the clutch front teeth 30b1 and the clutch rear teeth 30b2 while being guided by the lateral surfaces 30b9 of the clutch front teeth 30b1.

Next, the control unit 10 determines whether or not the sleeve 36 reaches the rear end position RE of the third dog clutch portion 30a (the rear end portion of the clutch rear teeth 30b2 serving as a rear teeth rear end portion) in S108. The state where the sleeve 36 reaches the rear end position RE of the third dog clutch portion 30a (S2 in FIG. 9) as illustrated in FIG. 15 indicates that the high teeth 36a1 and the low teeth 36a2 of the sleeve 36 are completely meshed with the clutch front teeth 30b1 and the clutch rear teeth 30b2.

In a case where it is determined that the sleeve 36 reaches the rear end position RE of the third dog clutch portion 30a, the control unit 10 controls the axial driving device 40 to stop the application of the first thrust load F1 in S109. The sleeve 36 is held at the rear end position RE by the detent mechanism 58 and the shifting operation is terminated.

In the dog clutch control apparatus for the automated transmission of the embodiment, after each of the high teeth 36a1 of the sleeve 36 (the front end surfaces 36a4 of the high teeth 36a1) enters between the clutch front teeth 30b1, specifically, between each of the clutch front teeth 30b1 and the clutch rear tooth 30b2 adjacent to the clutch front tooth 30b1, a state where the rotational difference between the sleeve 36 and the third clutch ring 30 is reduced while each of the high teeth 36a1 of the sleeve 36 is in contact with the end surface, i.e., the front end surface 30b6, of each of the clutch rear teeth 30b2 without making contact with the lateral surface 30b9 of each of the clutch front teeth 30b1 or a state where the third clutch ring 30 and the sleeve 36 co-rotate with each other is detectable by the deceleration gradient of the rotation speed of the sleeve 36 smaller than the first predetermined value that indicates the mild deceleration gradient (for example, 1/5) in a case where the rotation speed of the sleeve 36 in a free state is fast while the rotation speed of the third clutch ring 30 is slow, for example. The state where the rotational difference between the sleeve 36 and the third clutch ring 30 is small or the sleeve 36 and the third clutch ring 30 co-rotate with each other occurs due to a friction force that is generated on a basis of the thrust load for pressing the sleeve 36 against the third clutch ring 30. Thus, the thrust load applied from the sleeve 36 to the clutch rear teeth 30b2 of the third clutch ring 30 is reduced to release the state where the rotational difference between the sleeve 36 and the third clutch ring 30 is small or the sleeve 36 and the third clutch ring 30 co-rotate with each other. The rotational difference between the sleeve 36 and the third clutch ring 30 may be secured to reduce a time period for the sleeve 36 to make contact with the lateral surfaces 30b9 of the clutch front teeth 30b1 of the third clutch ring 30. The high teeth 36a1 of the sleeve 36 that make contact with the lateral surfaces 30b9 of the clutch front teeth 30b1 of the third clutch ring 30 reach the rear end position RE of the third dog clutch portion 30*a*, i.e., of the tooth grooves 30*b*10 of the clutch rear teeth 30*b*2 while being guided by the lateral surfaces 30*b*9 of the clutch front teeth 30*b*1. At this time, all the inner teeth 36*a* including the low teeth 36*a*2 of the sleeve 36 are meshed with all the dog clutch teeth 30*b* of the third clutch ring 30. Thus, the engagement between the sleeve 36 and the third clutch ring 30 may be promptly performed. Because the deceleration gradient of the rotation speed of the sleeve 36 is detected to determine whether the sleeve 36 and the third clutch ring 30 co-rotate with each other, for example, a state in which the sleeve 36 and the third clutch ring 30 are unable to be bought into engagement with each other may be predicted beforehand, which may result in prompt shifting operation.

In a case where the deceleration gradient of the rotation speed of the sleeve 36 exceeds the second predetermined value serving as a large value (for example, 13/2), the high teeth 36*a*1 of the sleeve 36 make contact with the lateral surfaces 30*b*9 of the clutch front teeth 30*b*1 so that the rotation speed of the sleeve 36 is rapidly reduced. Thus, the first thrust load F1 is applied from the sleeve 36 to the clutch rear teeth 30*b*2 so that the high teeth 36*a*1 of the sleeve 36 that make contact with the lateral surfaces 30*b*9 of the clutch front teeth 30*b*1 of the third clutch ring 30 rapidly reach the rear end position (RE) of the third dog clutch portion 30*a* while being guided by the lateral surfaces 30*b*9 of the clutch front teeth 30*b*1.

The stroke position sensor 38 is provided to detect the moving position of the sleeve 36 in the direction of the rotation axis CL. Because of the stroke position sensor 38, whether or not the high teeth 36*a*1 of the sleeve 36 are in contact with the front end surfaces 30*b*6 of the clutch rear teeth 30*b*2, and whether or not the high teeth 36*a*1 of the sleeve 36 are in contact with the lateral surfaces 30*b*9 of the clutch front teeth 30*b*1 may be further securely determined. The prompt and highly accurate shifting operation may be achieved.

In a case where the sleeve 36 moves to the third clutch ring 30, it may be possible for each of the high teeth 36*a*1 to enter to be fitted to the tooth groove 30*b*8 or 30*b*10 formed between the dog clutch teeth 30*b* adjacent to each other while not being guided by the lateral surfaces 30*b*9 of the clutch front teeth 30*b*1. Nevertheless, it is considered that the high teeth 36*a*1 and/or the low teeth 36*a*2 may be possibly bounced back by the clutch rear teeth 30*b*2 because of a small teeth distance between the clutch rear teeth 30*b*2 adjacent to each other. Therefore, in order to bring the high teeth 36*a*1 to be immediately meshed with the dog clutch teeth 30*b*, it may be effective for the high teeth 36*a*1 to be guided by the lateral surfaces 30*b*9 of the clutch front teeth 30*b*1 to be fitted to the tooth groves 30*b*10 adjacent to the clutch front teeth 30*b*1.

Next, the automated transmission including the dog clutch control apparatus for the automated transmission according to a second embodiment applied to a vehicle will be explained with reference to the attached drawings. As illustrated in FIG. 2, the sleeve 45, the first clutch ring 44 serving as the first output gear, and the second clutch ring 46 serving as the second output gear constitute the dog clutch transmission mechanism serving as the first dog clutch transmission mechanism for controlling the engagement between the first clutch ring 44 and the sleeve 45. In this case, the output shaft 42 serving as the output shaft and the rotary shaft rotates with the driving wheels Wfl and Wfr at a low speed while the sleeve 45 rotates at a low speed with the output shaft 42.

At this time, the sleeve 45 rotates together with the driving wheels Wfl and Wfr, and thus includes a large inertia force. The first clutch ring 44 is meshed with the first input gear 26 provided around the input shaft 24 that is driven to rotate by the driving force of the engine 11 to rotate at a high speed. The first clutch ring 44 serves as an idler gear relative to the output shaft 42. In the second embodiment, a case where the clutch 12 is disconnected to cause the first clutch ring 44 (in a free state) rotating at the high speed to be meshed with the sleeve 45 (the output shaft 42) rotating at the low speed is explained. At this time, the rotation speed (the number of rotations) of the sleeve 45 is detected by the rotation speed detection sensor 49 and the rotation speed of the first clutch ring 44 is detected by the rotation speed detection sensor 39. That is, the detection relationship between the rotation speed detection sensors 39 and 49 is reversed from the first embodiment. In the engagement control, in a case where the deceleration gradient of the rotation speed of the first clutch ring 44 that is rotating faster is smaller than the first predetermined value, the thrust load is reduced to the second thrust load F2 from the first thrust load F1. On the other hand, in a case where the deceleration gradient of the rotation speed of the first clutch ring 44 is greater than the second predetermined value, the first thrust load F1 is applied to the sleeve 45. Except for the aforementioned configurations, the configurations of the second embodiment are substantially the same as the first embodiment and thus explanation is omitted.

Accordingly, the state where the first clutch ring 44 and the sleeve 45 rotate relative to each other with a small rotational difference therebetween (or co-rotate with each other) may be controlled (changed) to the state where the rotational difference is secured on a basis of the deceleration gradient of the rotation speed of the clutch ring (the first clutch ring) 44. The prompt shifting operation may be obtained. The other effects of the second embodiment are substantially the same as the first embodiment and thus explanation is omitted.

As mentioned above, in a case where the first clutch ring 44 in a free state rotates at the high speed while the sleeve 45 rotates at the low speed, the deceleration gradient of the rotation speed of the first clutch ring 44 is detected to determine whether or not the deceleration gradient is smaller than the first predetermined value. As a result, the state where the sleeve 45 and the first clutch ring 44 are unable to be brought into engagement with each other may be predicted beforehand.

In the first and second embodiments, the two clutch front teeth are provided on the circumference of the clutch ring so as to face each other. Alternatively, three or more than three clutch front teeth, for example, may be provided on the circumference of the clutch ring to be equally spaced from one another.

In addition, in the first and second embodiments, the thrust load generated by the linear actuator 40*i* before the thrust load is reduced and the thrust load generated by the linear actuator 40*i* after it is detected that the deceleration gradient is greater than the second predetermined value are both equal to the first thrust value F1. Alternatively, one of the aforementioned thrust loads may be greater than the other of the thrust loads, for example.

Further, the rotary shaft rotatably connected to the input shaft of the automated transmission includes the rotary shaft connected directly to the input shaft as described in the first embodiment. The rotary shaft rotatably connected to the output shaft of the automated transmission includes the rotary shaft connected directly to the output shaft as described in the second embodiment.

Furthermore, in the embodiments, each of the rotation speed detection sensors 39 and 49 is formed by a rotary encoder. Alternatively, each of the rotation speed detection sensors 39 and 49 may be formed by a known sensor including a resolver, for example.

The embodiments may not be limited to the aforementioned configurations and the attached drawings and may be appropriately modified or changed within a scope of the embodiments.

According to the aforementioned embodiments, the control unit 10 controls the axial driving device 40 so that the first thrust load F1 is applied to the clutch rear teeth 30$b$2 from the sleeve 36, 45 in a case where the deceleration gradient of the rotation speed of either one of the sleeve 36, 45 and the clutch ring 30, 44 detected by the rotation speed detection sensor 39, 49 exceeds the second predetermined value which is greater than the first predetermined value after the second thrust load F2 is applied to the clutch rear teeth 30$b$2 from the sleeve 36, 45.

In addition, according to the aforementioned embodiments, the dog clutch transmission mechanism further includes the stroke position sensor 38 for detecting the moving position of the sleeve 36, 45 in the direction of the rotation axis CL, and the control unit 10 controls the operation of the axial driving device 40 based on the position detected by the stroke position sensor 38 in addition to controlling the axial driving device 40 based on the deceleration gradient of the rotation speed of either one of the sleeve 36, 45 and the clutch ring 30, 44 detected by the rotation speed detection sensor 39, 49, the control unit 10 controlling the axial driving device 40 so that the second thrust load F2 is applied to the clutch rear teeth 30$b$2 from the sleeve 36, 45 in a case where the control unit 10 detects that the sleeve 36, 45 reaches the position of the clutch rear tooth 30$b$2 by the stroke position sensor 38 and the deceleration gradient of the rotation speed of either one of the sleeve 36, 45 and the clutch ring 30, 44 detected by the rotation speed detection sensor 39, 49 is smaller than the first predetermined value.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A dog clutch control apparatus for an automated transmission, comprising:
   a rotary shaft rotatably connected to one of an input shaft of an automated transmission and an output shaft of the automated transmission and supported to be rotatable about an axis;
   a dog clutch transmission mechanism including
      a clutch ring rotatably supported at the rotary shaft and rotatably connected to the other of the input shaft and the output shaft, the clutch ring including a mating portion,
      a clutch hub fixed to the rotary shaft and arranged adjacent to the clutch ring,
      a sleeve including a spline and fitted to the clutch hub via the spline to be movable in a direction of the axis,
      an axial driving device for moving the sleeve in the direction of the axis,
      a dog clutch portion provided at the mating portion of the clutch ring and selectively meshed with the spline of the sleeve in response to an axial movement of the sleeve, the mating portion projecting towards the sleeve,
      a rotation speed detection sensor for detecting a rotation speed of either one of the sleeve and the clutch ring,
      the spline including a plurality of high teeth, the rest of the spline corresponding to a low tooth, a tooth depth of each of the high teeth being larger than a tooth depth of the low tooth,
      clutch front teeth formed at the dog clutch portion to be extended from a front end surface of the dog clutch portion to a rear end position of the dog clutch portion and arranged at positions corresponding to positions of the high teeth, the clutch front teeth of which an outer diameter being larger than an inner diameter of the high teeth and smaller than an inner diameter of the low tooth, and
      clutch rear teeth formed at the dog clutch portion to be extended from a position which is retracted from the front end surface of the dog clutch portion by a predetermined amount to the rear end position of the dog clutch portion, the clutch rear teeth being configured to be meshed with tooth grooves of the spline; and
   a control unit controlling an operation of the axial driving device based on a deceleration gradient of the rotation speed of either one of the sleeve and the clutch ring detected by the rotation speed detection sensor,
   the control unit controlling the axial driving device so that a decreased thrust load is applied to the clutch rear teeth from the sleeve in a case where the deceleration gradient of the rotation speed of either one of the sleeve and the clutch ring detected by the rotation speed detection sensor is smaller than a first predetermined value.

2. The dog clutch control apparatus according to claim 1, wherein the control unit controls the axial driving device so that an increased thrust load is applied to the clutch rear teeth from the sleeve in a case where the deceleration gradient of the rotation speed of either one of the sleeve and the clutch ring detected by the rotation speed detection sensor exceeds a second predetermined value which is greater than the first predetermined value after the decreased thrust load is applied to the clutch rear teeth from the sleeve.

3. The dog clutch control apparatus according to claim 1, wherein the dog clutch transmission mechanism further includes a stroke position sensor for detecting a moving position of the sleeve in the direction of the axis, and the control unit controls the operation of the axial driving device based on a position detected by the stroke position sensor in addition to controlling the axial driving device based on the deceleration gradient of the rotation speed of either one of the sleeve and the clutch ring detected by the rotation speed detection sensor, the control unit controlling the axial driving device so that the decreased thrust load is applied to the clutch rear teeth from the sleeve in a case where the control unit detects that the sleeve reaches a position of the clutch rear tooth by the stroke position sensor and the deceleration gradient of the rotation speed of either one of the sleeve and the clutch ring detected by the rotation speed detection sensor is smaller than the first predetermined value.

4. The dog clutch control apparatus according to claim 2, wherein the dog clutch transmission mechanism further includes a stroke position sensor for detecting a moving position of the sleeve in the direction of the axis, and the control unit controls the operation of the axial driving device based on a position detected by the stroke position sensor in addition to controlling the axial driving device based on the deceleration gradient of the rotation speed of either one of the sleeve and the clutch ring detected by the rotation speed detection sensor, the control unit controlling the axial driving device so that the decreased thrust load is applied to the clutch rear teeth from the sleeve in a case where the control unit detects that the sleeve reaches a position of the clutch rear tooth by the stroke position sensor and the deceleration gradient of the rotation speed of either one of the sleeve and the clutch ring detected by the rotation speed detection sensor is smaller than the first predetermined value.

* * * * *